(12) United States Patent
Arnott

(10) Patent No.: US 7,117,175 B2
(45) Date of Patent: Oct. 3, 2006

(54) METHOD AND APPARATUS FOR MANAGING A VIRTUAL MUTUAL FUND

(75) Inventor: Robert D. Arnott, Pasadena, CA (US)

(73) Assignee: Research Affiliates, LLC, Pasadena, CA (US)

( * ) Notice: Subject to any disclaimer, the term of this patent is extended or adjusted under 35 U.S.C. 154(b) by 290 days.

(21) Appl. No.: 10/252,761

(22) Filed: Sep. 23, 2002

(65) Prior Publication Data

US 2006/0041489 A1    Feb. 23, 2006

Related U.S. Application Data

(60) Provisional application No. 60/371,662, filed on Apr. 10, 2002.

(51) Int. Cl.
*G06Q 40/00* (2006.01)
(52) U.S. Cl. .................................. 705/36 R; 705/36 T
(58) Field of Classification Search ............ 705/10–52, 705/1
See application file for complete search history.

(56) References Cited

U.S. PATENT DOCUMENTS

| | | | | |
|---|---|---|---|---|
| 6,161,098 | A | * | 12/2000 | Wallman ...................... 705/36 |
| 6,317,728 | B1 | | 11/2001 | Kane |
| 6,360,210 | B1 | * | 3/2002 | Wallman ................... 705/36 R |
| 6,393,409 | B1 | * | 5/2002 | Young et al. ................. 705/37 |

FOREIGN PATENT DOCUMENTS

WO    WO 98/44444    * 10/1998

OTHER PUBLICATIONS

Davey, Tom, "3-D Market Monitor", Informationweek n725 PP:73, Mar. 15, 1999, ISSN: 8750-6874, Dialog file 15, Accession No. 01843989.*

* cited by examiner

*Primary Examiner*—Frantzy Poinvil
(74) *Attorney, Agent, or Firm*—Venable LLP; Ralph P. Albrecht

(57) ABSTRACT

A method and apparatus system for managing virtual mutual funds. A plurality of investment managers manage a plurality of accounts for a plurality of investors. The investors directly hold assets in the accounts so that the investors may take advantage of any tax benefits generated by transactions using the assets in the accounts. An investor may have one or more accounts and thus one or more managers. A manager may have one or more investors and thus one or more accounts to manage. A virtual mutual fund manager uses a holdings matrix and a lot matrix to track the asset lots in the accounts. When a manager wishes to make a trade affecting an investor, the virtual mutual fund manager determines which asset lots held by the investor should be used to execute the trade. Optionally, each investor may be associated with a tax-managed account. The tax-managed account is used by the virtual fund manager to make deferred "paper" trades thereby avoiding certain adverse tax consequences that may be created when an investor has multiple managers. Optionally, each investor may allow loss-harvesting trades to be executed on his or her behalf in circumstances where such trades may reduce the investor's tax obligations.

32 Claims, 19 Drawing Sheets

METHOD AND APPARATUS FOR MANAGING A VIRTUAL MUTUAL FUND

CROSS-REFERENCE TO RELATED APPLICATION

The present application claims priority to U.S. Provisional Patent Application No. 60/371,662, filed Apr. 10, 2002, attorney docket number 47997/FLC/A750, which is hereby incorporated by reference as if set forth in full herein.

BACKGROUND OF THE INVENTION

This invention relates generally to the field of systems for managing financial transactions and more specifically to systems for managing investments made on the behalf of investors by investment managers.

Some investors in securities, such as stocks and bonds, choose not to manage their own portfolios but instead rely on professional investment managers to manage and diversify their portfolios. One way to access the services of a professional investment manager is for an investor to buy shares in a mutual fund. In doing so, the investor is able to take advantage of a professional manager's expertise along with other investors. However, an investor in a mutual fund does not directly hold the assets purchased by the professional manager, thus the investor loses some of the tax benefits of directly holding an asset.

Another way that an investor can use professional investment managers and diversify a portfolio is by allowing a group of professional managers to directly manage multiple portfolios where the investor directly holds the assets in the multiple portfolios. This allows an investor to take advantage of a diversity of investment strategies and capture any tax benefits from directly holding an asset. However, this may create tax problems for the investor. For example, one manager may buy an asset too soon after another manager has sold the same asset, thus creating a "wash sale". Another problem may occur when one manager buys an asset at the same time another manager sells the same asset, thus creating a taxable event for the investor without actually generating any income for the investor.

Therefore, a need exists for an investment management system that allows an investor to take advantage of the investment expertise from a variety of professional investment managers. In addition, the investment management system should allow the investor to reap the tax benefits from directly holding an asset without creating undue adverse tax consequences. The present invention meets such need.

SUMMARY OF THE INVENTION

A method and apparatus system for managing virtual mutual funds is provided. A plurality of investment managers manage a plurality of accounts for a plurality of investors. The investors directly hold assets in the accounts so that the investors may take advantage of any tax benefits generated by transactions using the assets in the accounts. An investor may have one or more accounts and thus one or more managers. A manager may have one or more investors and thus one or more accounts to manage. A virtual mutual fund manager uses a holdings matrix and a lot matrix to track the asset lots in the accounts. When a manager wishes to make a trade affecting an investor, the virtual mutual fund manager determines which asset lots held by the investor should be used to execute the trade.

In another aspect of the invention, each investor is associated with a tax-managed account. The tax-managed account is used by the virtual fund manager to make deferred "paper" trades thereby avoiding certain adverse tax consequences that may be created when an investor has multiple managers.

In another aspect of the invention, each investor may allow loss-harvesting trades to be executed on his or her behalf in circumstances where such trades may reduce the investor's tax obligations.

In another aspect of the invention, one or more virtual mutual funds are managed by one or more managers on behalf of one or more investors with separately-owned portfolio bases. A database is provided associating a plurality of lots separately owned by the one or more investors as tradeable by each of the one or more managers whereby a lot may be traded by a manager regardless of which manager initiated purchase of the lot. A set of lot selection rules is used to select a lot for trading from the plurality of lots using the and a trade requested by a manager. The lot selection rules include a rule for selecting a lot with a highest cost basis for trading.

In another aspect of the invention, the investors are associated with tax-managed accounts. Taxation rules are used to determine if a trade using a selected lot should be deferred in order to avoid an unfavorable taxation event for an investor. If a trade should be deferred, a deferred trade is generated in the tax-managed sub-account associated with an investor. Any deferred trades are periodically monitored and deferred trades in a tax-managed sub-account are selected for execution if it is determined that the deferred trade should no longer be deferred using the database and the set of taxation rules.

In another aspect of the invention, a plurality of trades received from one or more managers are processed by selecting a plurality of lots for trade execution and aggregating any executed trades for reconciliation with the one or more managers.

In another aspect of the invention, a data processing system is provided for managing one or more virtual mutual funds by one or more managers with separate portfolio bases owned by one or more individual investors. The data processing system includes a holdings matrix database associating the one or more managers with the one or more virtual mutual funds and a lot matrix database associating a plurality of lots separately owned by the one or more investors with the one or more virtual mutual funds. The data processing system has a processor and a memory coupled to the processor having program instructions stored therein. The processor is operable to execute the program instructions. The program instructions include taxation rules and lot selection rules and direct the data processing system to receive one or more requested trades for the one or more virtual mutual funds from the one or more managers. For each requested trade in the one or more requested trades a lot is selected from the plurality of lots for execution using the lot selection rules, the taxation rules, the holdings matrix, and the lot matrix.

In another aspect of the invention, data processing system includes program instructions to determine if a requested trade should be deferred using the holdings matrix, the lot matrix, and the taxation rules. If a trade should be deferred, it is deferred by generating a deferred trade in a tax-managed sub-account associated with an investor.

In another aspect of the invention, the data processing system further includes program instructions for selecting a deferred trade in a tax-managed sub-account for execution if it is determined that the deferred trade should no longer be deferred using the lot matrix and the set of taxation rules.

In another aspect of the invention, the data processing system generates trades for execution from the selected lots and aggregates the generated trades for a virtual mutual fund from the one or more virtual mutual funds. In addition, the data processing system aggregates tax savings across the one or more virtual mutual funds for each of the one or more investors.

In another aspect of the invention, a method of managing one or more virtual mutual funds by one or more managers on behalf of one or more investors with separately-owned portfolio bases is provided wherein the investor's portfolios are examined for opportunities to realize losses for tax purposes. A database is provided associating a plurality of holdings owned by an investor to separate managers in separate manager accounts whereby a holding may be traded regardless of which manager initiated purchase of the holding. An investor's holdings are examined and a deferred trade is generated in a tax-managed sub-account associated with the investor if it is determined that a holding should be sold in order to realize a loss for the investor whereby a manager's account is unaffected by the loss realized by the sale of the holding.

In another aspect, an offsetting purchase of the holding is generated if it is determined that enough time has passed to avoid a wash-sale violation.

In another aspect of the invention, losses are realized for an investor by a data processing system having a database associating a plurality of holdings owned by an investor to separate managers in separate manager accounts whereby a holding may be traded regardless of which manager initiated purchase of the holding. The data processor has a processor and a memory coupled to the processor having program instructions stored therein. The processor is operable to execute the program instructions which direct the data processing system to generate a deferred trade in a tax-managed sub-account associated with the investor using a holding if it is determined that the holding should be sold in order to realize a loss for the investor whereby a manager's account is unaffected by the loss realized by the sale of the holding. To offset the deferred trade, an offsetting purchase of a temporary offsetting holding is generated which is held until the original holding is repurchased.

BRIEF DESCRIPTION OF THE DRAWINGS

These and other features, aspects, and advantages of the present invention will become better understood with regard to the following description, appended claims, and accompanying drawings where:

DETAILED DESCRIPTION

Figure 1:
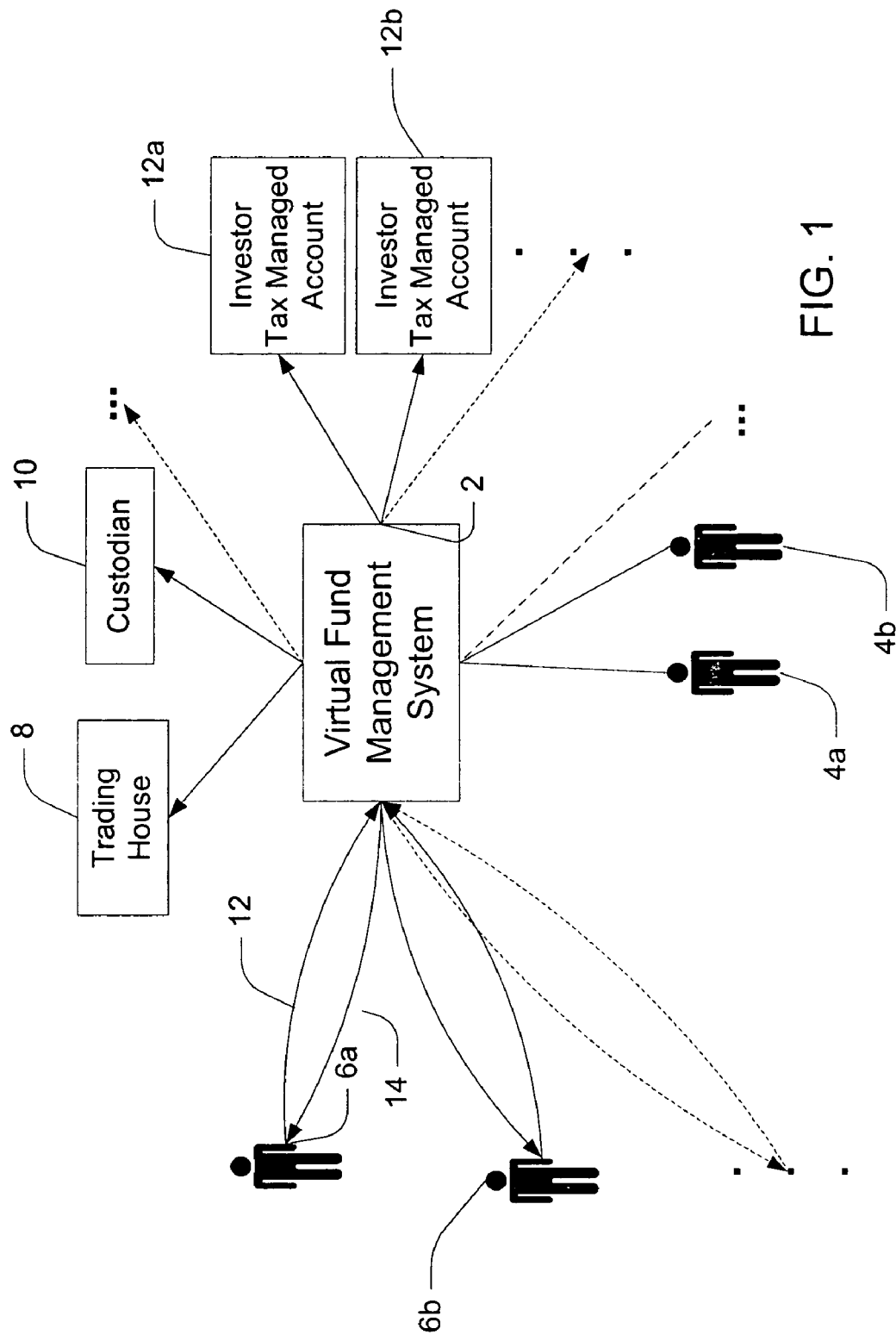
FIG. 1 is a block diagram of a virtual mutual fund management system in accordance with an exemplary embodiment of the present invention.

FIG. 1 is a block diagram of a virtual mutual fund management system in accordance with an exemplary embodiment of the present invention. A virtual mutual fund management system 2 manages trades of securities such as stocks made on behalf of one or more investors, as exemplified by investors 4a and 4b, by one or more managers, as exemplified by managers 6a and 6b. The investors may include individuals and institutional investors such as pension funds, trusts, corporations, etc. The managers make trade requests, as exemplified by trade request 12, of securities on behalf of the investors and the virtual mutual fund management system determines if the trades should be made in consideration of the tax consequences for each investor. If the virtual mutual fund management system determines that a requested trade should take place, the virtual mutual fund management system requests the trades from one or more trading houses, as exemplified by trading house 8, or one or more custodians, as exemplified by custodian 10. In making the trade, the virtual mutual fund management system determines which of several lots of securities held by an investor should be used to make the trade so as to minimize any adverse tax consequences of the trade. If a trade should not take place because of an avoidable adverse tax consequence to an investor, the virtual mutual fund management system creates a deferred "paper" trade for the investor in a tax-managed sub-account 12a. The virtual mutual fund management system monitors the status of the deferred paper trade and consummates the deferred trade with an actual trade when the trade no longer creates an adverse tax consequence for the investor. The virtual mutual fund management system transmits back to the managers reconciliations of the managers' positions as exemplified by reconciliation 14.

Figure 2:
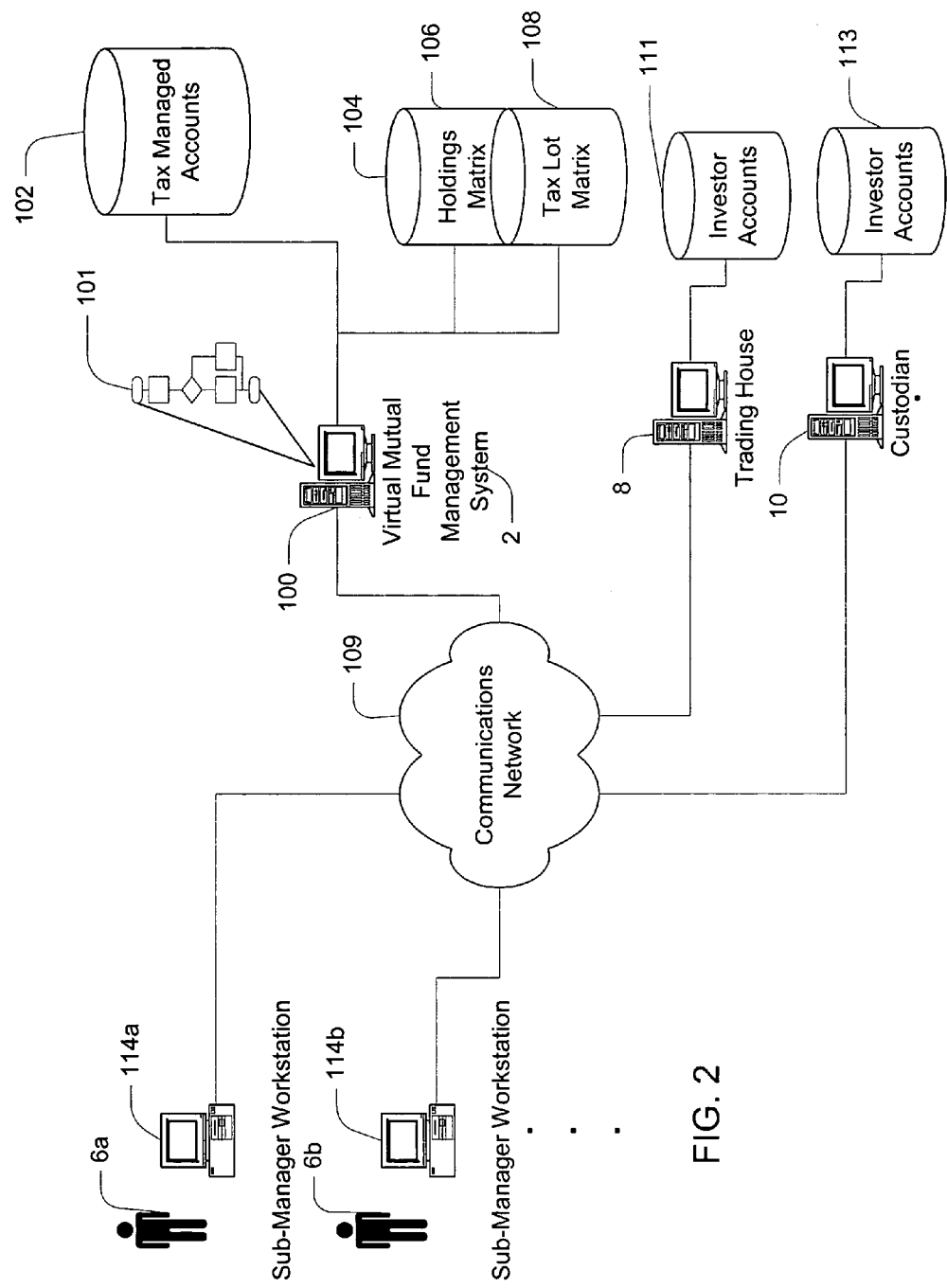
FIG. 2 is a deployment diagram of a virtual mutual fund management system in accordance with an exemplary embodiment of the present invention.

FIG. 2 is a deployment diagram of a virtual mutual fund management system in accordance with an exemplary embodiment of the present invention. A virtual mutual fund management system 2 includes a virtual mutual fund host 100 and software objects 101 implementing the features of the virtual mutual management system. The collective software objects are herein after termed a "virtual mutual fund manager". The virtual mutual fund manager is operably coupled to a database of tax-managed sub-accounts 102 and a tracking database 104. As previously described, a tax-managed sub-account is an sub-account held in an investor's name where paper trades are held for actual trades deferred because of adverse tax consequences. The tracking database includes a holdings matrix 106 associating exemplary managers 6a and 6b with a virtual mutual fund. The tracking database further includes a tax lot matrix associating specific lots of securities held in the name of investors to a virtual mutual fund.

The virtual mutual fund manager is operably coupled through a communications network 109 to one or more trading houses, as exemplified by trading house 8, or one or more custodians, as exemplified by custodian 10. The trading houses and custodians manage actual investor sub-accounts, 111 and 112 respectively, for an investor or investors participating in the virtual mutual fund. The managers use manager workstations, as exemplified by manager workstations 114a and 144b, to transmit trade requests to the virtual mutual fund manager via the communications network.

Figure 3:
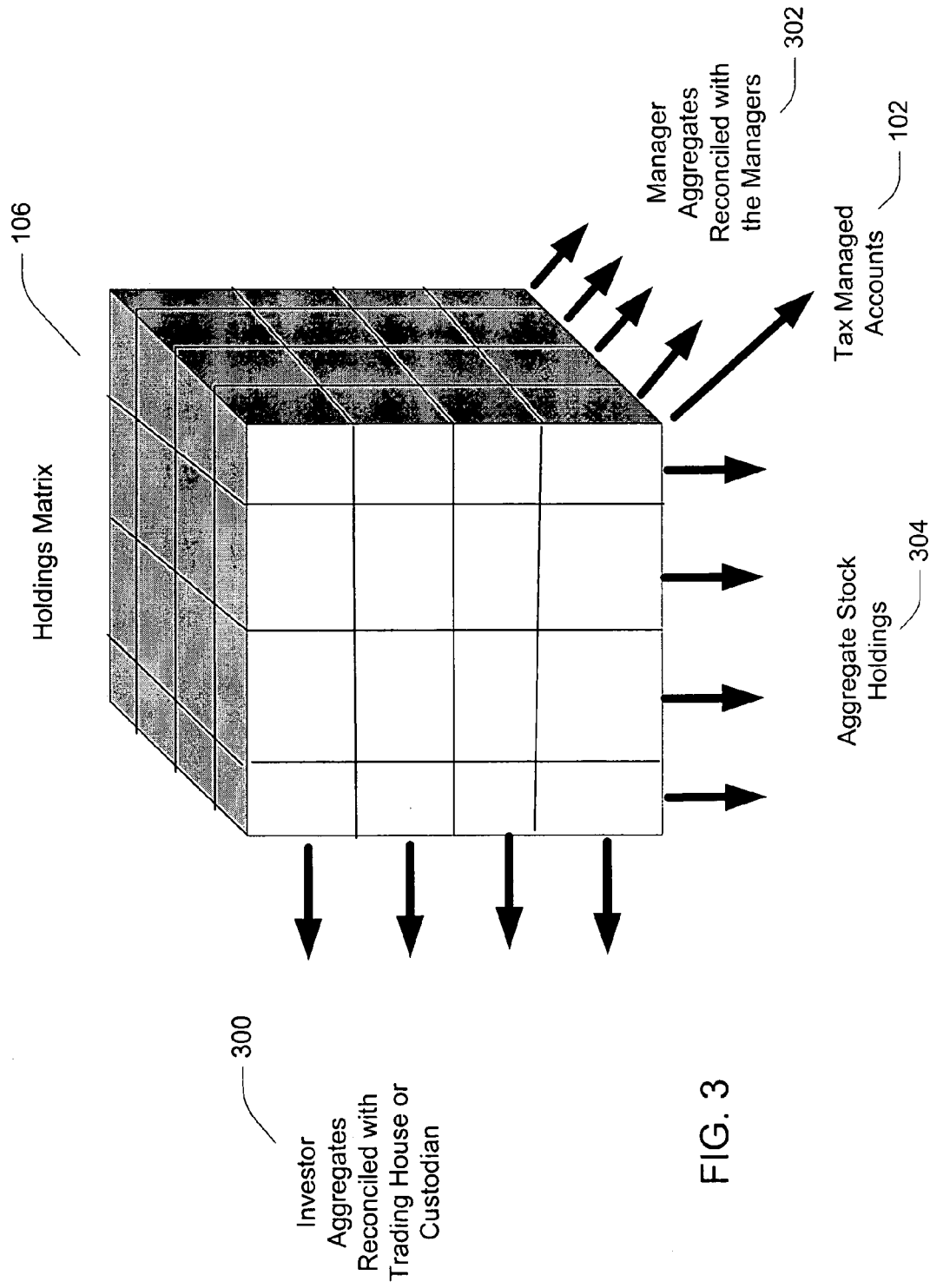
FIG. 3 is a diagram of a holdings matrix in accordance with an exemplary embodiment of the present invention.

FIG. 3 is a diagram of a holdings matrix in accordance with an exemplary embodiment of the present invention. A holding matrix 106 is a paper portfolio including the lot matrix less deferred trades. The holdings matrix associates one or more managers with the holdings of one or more investors. The holdings matrix is used to generate investor aggregates 300 for reconciliation with a trading house or custodian. As each manager has a separate portfolio base, the holdings matrix is also used to generate manager aggregates 302 for reconciliation by the managers of their respective positions in their respective portfolio bases. The holdings matrix is also used to determine the aggregate holdings of a particular asset 304. The holdings matrix may also associate an investor with one or more tax-managed sub-accounts 102.

In one embodiment of a holdings matrix in accordance with an exemplary embodiment of the present invention, the holdings matrix is realized in a database. For example, a database record may contain fields for an investor identifier, a manager identifier, an asset identifier, and the number of units of the asset held on sub-account for the investor. The database can then be queried to aggregate the holdings of a particular investor or of a particular manager.

Figure 4:
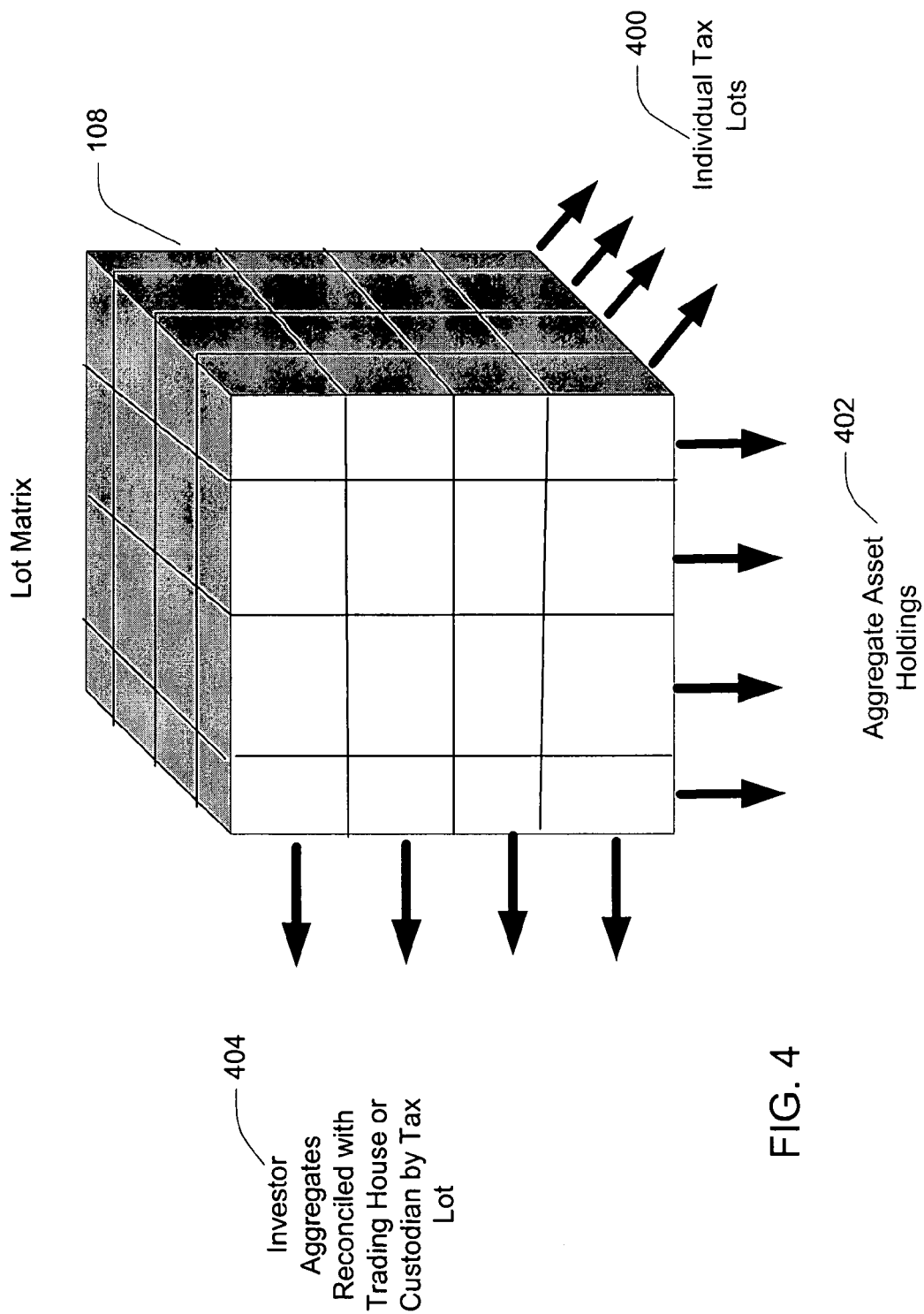
FIG. 4 is a diagram of a lot matrix in accordance with an exemplary embodiment of the present invention.

FIG. 4 is a diagram of a lot matrix in accordance with an exemplary embodiment of the present invention. A lot matrix 108 associates individual lots of assets 400 with investors. Once associated, a virtual mutual fund manager can determine which lots of assets to trade or defer for an investor based on the tax consequences of trading the lot for the investor's sub-account. Additionally, the lots can be reconciled (404) with a trading house or custodian or aggregated (402) in order to determine the investor's holdings at any time.

In an embodiment of a lot matrix in accordance with an exemplary embodiment of the present invention, the lot matrix is realized in a database. For example, a database record may contain fields for an investor identifier, an asset identifier, a date of purchase, number of units of the asset that were purchased, and the purchase price per unit of the asset. The database can then be queried in a variety of ways such as by investor identifier to create aggregations of holdings, by investor identifier and asset id to determine purchase prices, and investor identifier and asset id to determine purchase dates.

Figure 5:
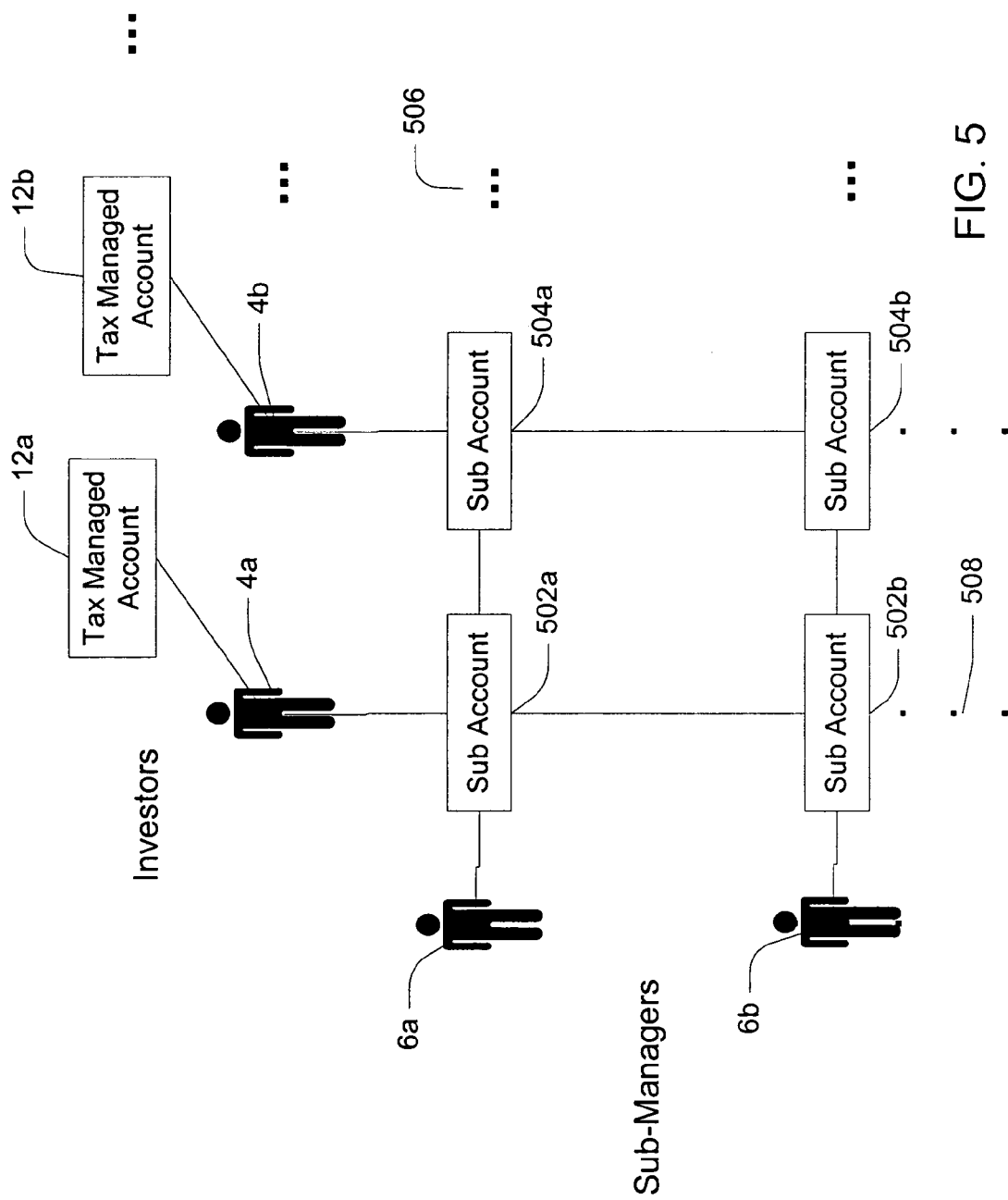
FIG. 5 is a block diagram of the associations between a plurality of virtual mutual funds, a plurality of managers, and a plurality of tax-managed sub-accounts in accordance with an exemplary embodiment of the present invention.

FIG. 5 is a block diagram of the associations between virtual mutual funds, a plurality of managers, and a plurality of tax-managed sub-accounts in accordance with an exemplary embodiment of the present invention. One or more managers, as exemplified by managers 6a and 6b, are associated with one or more investors, as exemplified by investors 4a and 4b, by sub-accounts, as exemplified by sub-accounts 502a, 502b, 504a, and 504b.

A single manager manages one or more sub-accounts, such as manager 6a managing sub-accounts 502a and 504a thus creating a "virtual mutual fund". In a conventional mutual fund, a group of investors make small investments into the mutual fund and a professional manager manages the mutual fund. However, the investors do not directly hold the assets of the mutual fund, thereby missing some of the tax advantages associated with holding an asset directly. A virtual mutual fund allows a group of investors to directly hold assets in sub-accounts, thereby capturing any tax benefits from the direct holdings, and have the benefit of a professional manager. In return, the virtual mutual fund allows a professional manager to have a group of investors with small investments aggregated into a single virtual mutual fund, thus making it economically feasible for the professional manager to manage investments for smaller investors. Each manager manages their virtual mutual fund as a separate portfolio base independently of the other managers with the virtual mutual fund manager resolving conflicts between manager requests for trades within the sub-accounts.

A manager makes trades using the investors' sub-accounts with each manager making trades for one or more investors. To determine a manager's position, investor sub-accounts managed by the manager are aggregated. For example, to determine manager 6a's position, sub-account 502a belonging to investor 4a and sub-account 504a belonging to investor 4b are aggregated. In this example, manager 6a is shown with only two investors. In other embodiments, manager 6a may manage many more sub-accounts, and thus many more investors, as indicated by ellipses 506.

To determine the aggregate holdings of an investor, the separate sub-accounts of an investor are aggregated. For example, to determine the holdings of investor 4a, sub-account 502a managed by manager 6a is aggregated with sub-account 502b managed by manager 6b. In this example, investor 4a is shown with only two sub-accounts. In other embodiments, investor 4a may have many more sub-accounts as indicated by ellipses 508. By having multiple sub-accounts managed by multiple managers, an investor can participate in multiple virtual mutual funds.

An investor may also be associated with a tax-managed sub-account as exemplified by tax-managed sub-account 12a associated with investor 4a and tax-managed sub-account 12b associated with investor 4b. A tax-managed sub-account is used to generate deferred trades on an investor's behalf if a requested trade will have an adverse tax consequence for an investor. For example, manager 6a may make a trade request that requires investor 4a and 4b to sell a particular asset. For investor 4a, this may have no adverse tax consequence and the trade is consummated using assets held in investor 4a's sub-account 502a. However, the requested trade may have adverse tax consequences for investor 4b. In this case the trade is replaced by a paper trade transferring assets from investor 4b's sub-account 504a to investor 4b's tax-managed sub-account 12b. In this example, manager 6a sees that all of the sub-accounts the manager manages have made the requested trade. However, investor 4b still holds the asset specified in the requested trade thus avoiding the adverse tax consequence for investor 4a.

Figure 6:
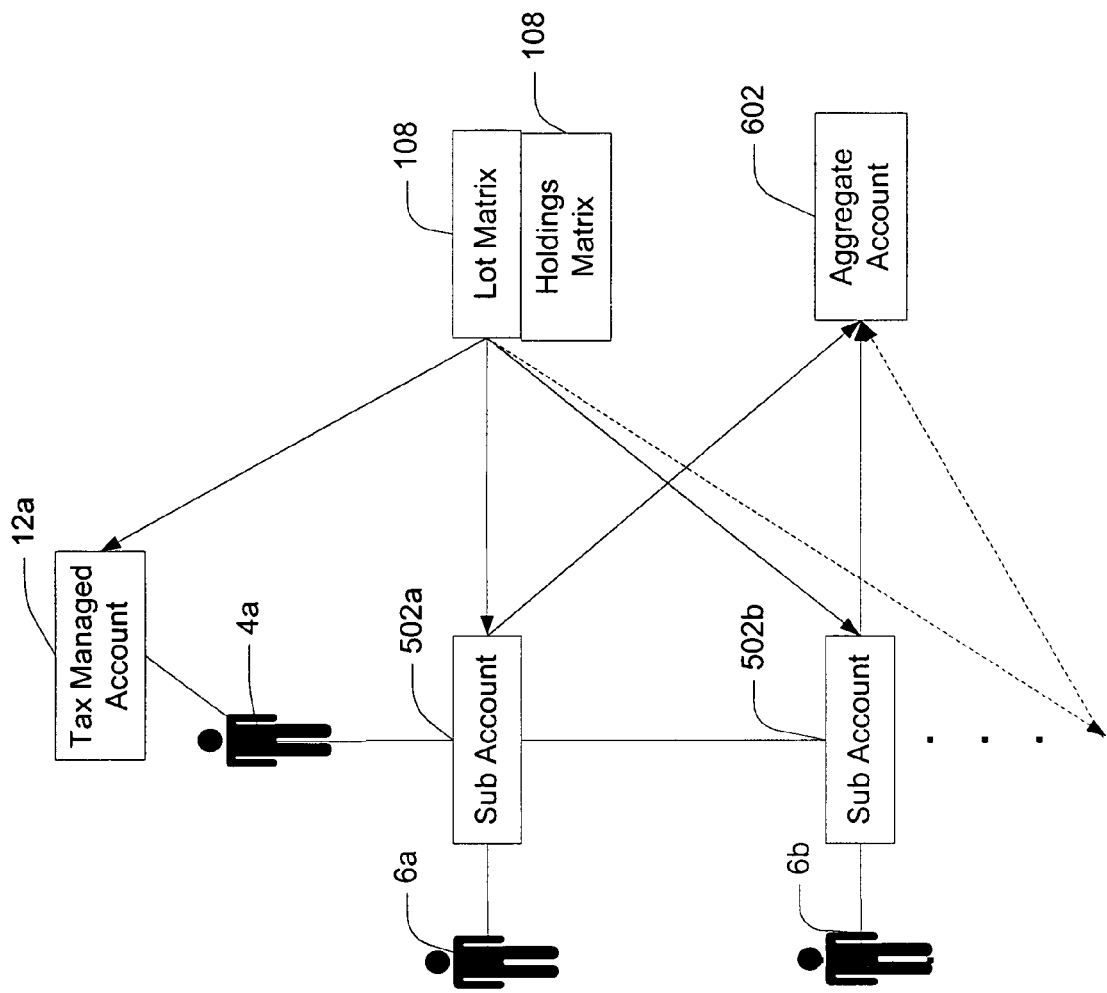
FIG. 6 is a block diagram of the associations between a plurality of managers and a single virtual mutual fund in accordance with an exemplary embodiment of the present invention.

FIG. 6 is a block diagram of the associations between a plurality of managers and a single virtual mutual fund in accordance with an exemplary embodiment of the present invention. An investor 4a is associated with one or more managers, as exemplified by managers 6a and 6b, through one or more sub-accounts as exemplified by sub-accounts 502a and 502b. The investor is also associated with a tax-managed sub-account 12a. The lots of assets held by the investor in each sub-account and the tax-managed sub-account are tracked using the previously described lot matrix 108 and holdings matrix 106. The sub-accounts for the investor can be aggregated using the holdings matrix to generate an aggregate sub-account 602 for the investor.

Figure 7:
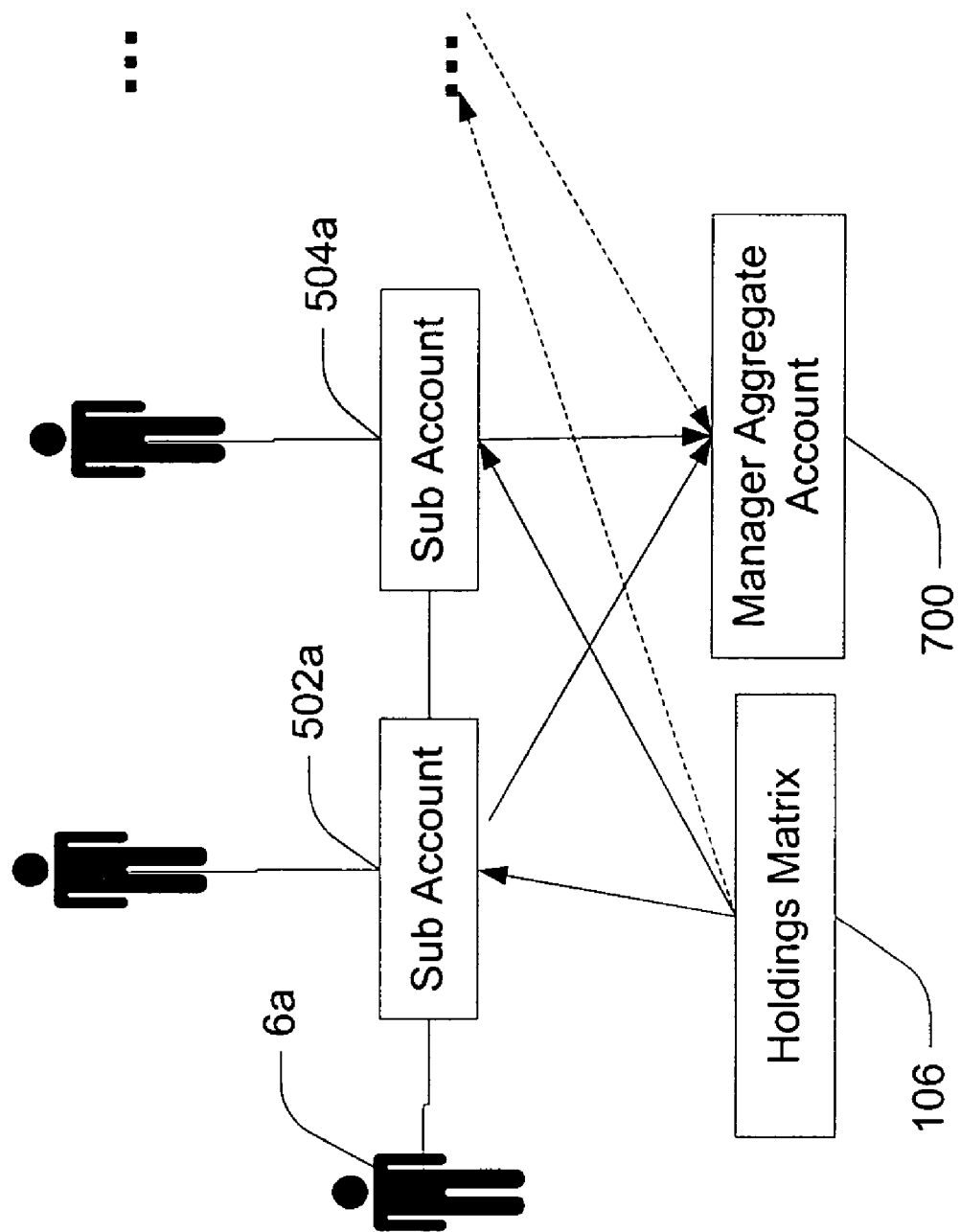
FIG. 7 is a block diagram of the associations between a manager and a plurality of virtual mutual funds in accordance with an exemplary embodiment of the present invention.

FIG. 7 is a block diagram of the associations between a manager and a plurality of, virtual mutual funds in accordance with an exemplary embodiment of the present invention. A manager 6a manages one or more sub-accounts, as exemplified by sub-account 502a associated with investor 4a and sub-account 504a associated with investor 4b. The associated sub-accounts are tracked using holdings matrix 106. Using the holdings matrix, a manager aggregate sub-account 700 can be generated for the manager.

Figure 8:
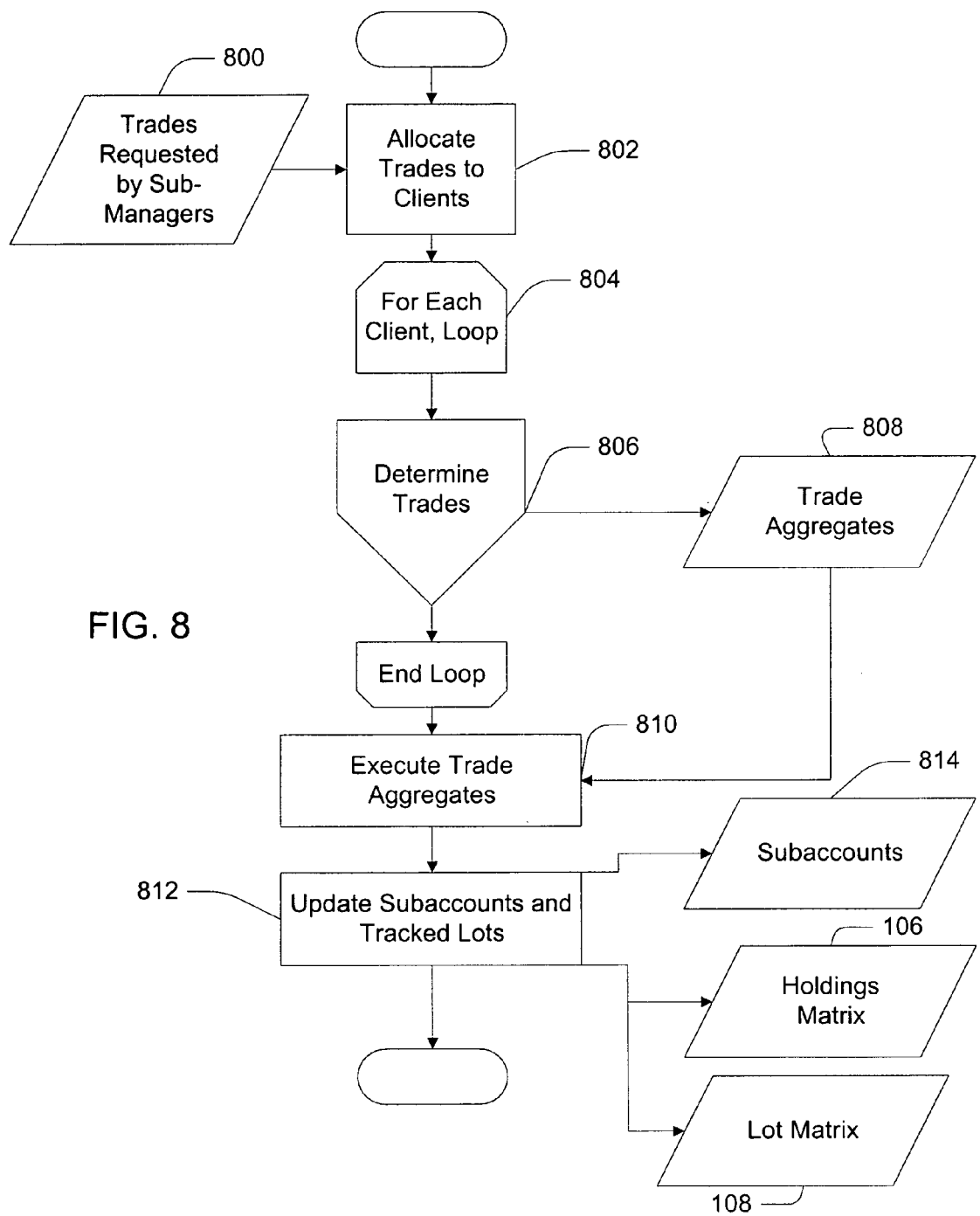
FIG. 8 is a process flow diagram of a trading process used by a virtual mutual fund manager in accordance with an exemplary embodiment of the invention.

FIG. 8 is a process flow diagram of a trading process used by a virtual mutual fund manager in accordance with an exemplary embodiment of the invention. The virtual mutual fund manager receives trades 800 requested by managers. The virtual mutual fund manager allocates (802) the requested trades to the investors. For each investor (804) the virtual fund manager determines (806) which trades should be processed from the investor's sub-accounts in a to-be-described process. The trades to be processed are aggregated into trade aggregates 808 for transmission to a trading house or a custodian. The collected trade aggregates are used to execute (810) the requested trades by transmitting the trade aggregates to a trading house or a custodian. The virtual fund manager updates (812) the investor's sub-accounts 814, the holdings matrix 104, and the lot matrix 106.

Figure 9:
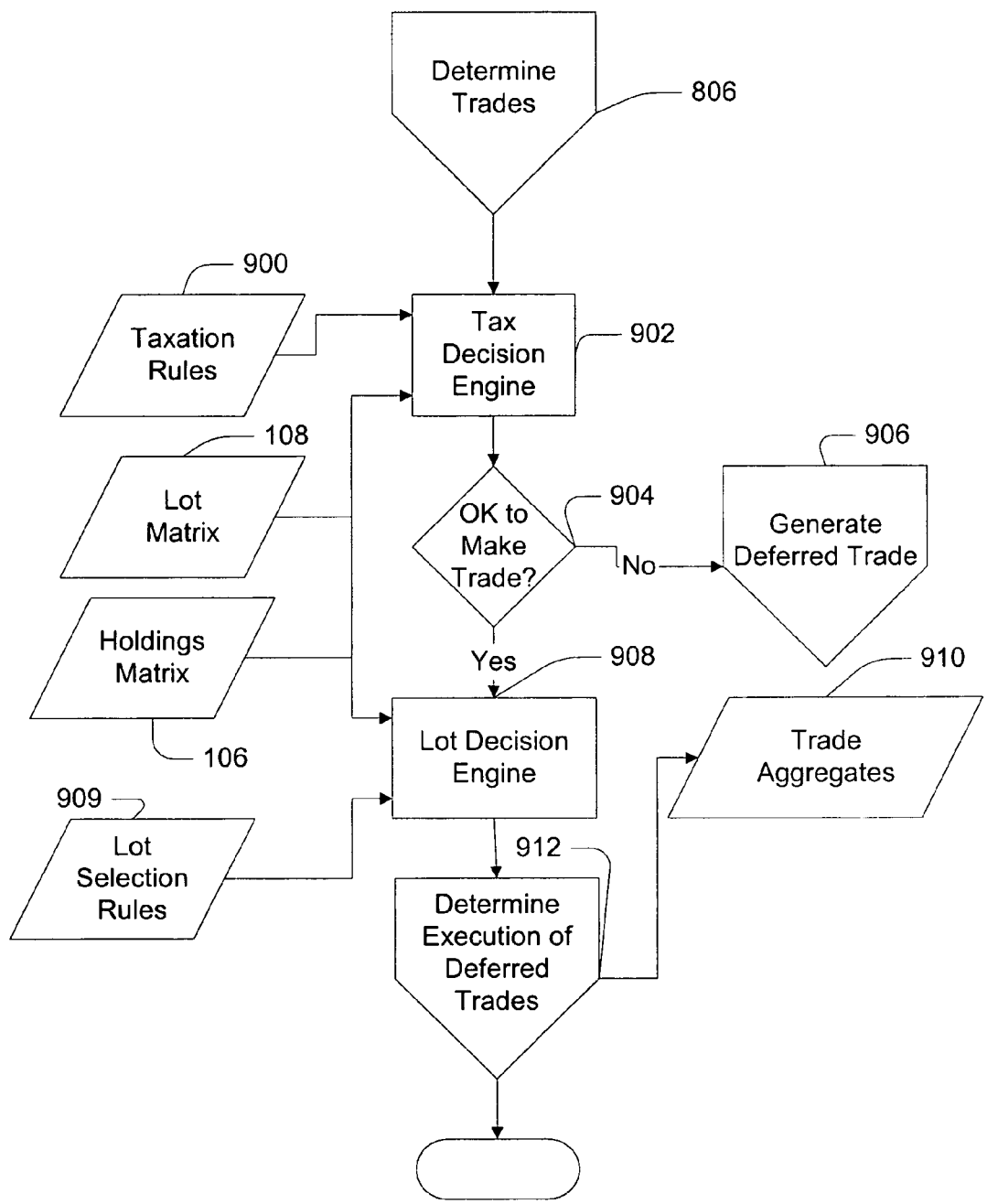
FIG. 9 is a process flow diagram of a trade determination process used by a virtual mutual fund manager in accordance with an exemplary embodiment of the invention.

FIG. 9 is a process flow diagram of a trade determination process 806 used by a virtual mutual fund manager in accordance with an exemplary embodiment of the invention. The virtual fund manager uses taxation rules 900, lot matrix 108, and holdings matrix 106 in a tax decision engine 902 to determine whether or not a requested trade will result in adverse tax consequences for the investor. If the virtual fund manager determines (904) that a requested trade will result in adverse trade consequences for the investor, the virtual fund manager generates (906) a deferred trade for the investor in a to-be-described process.

Deferred trades allow an investor to use multiple managers while avoiding some conflicts between the multiple managers. For example, a first manager may want to sell an asset from the investor's portfolio and a second manager may want to buy the same asset for the same investor's portfolio. Making the actual trades causes the second manager's trade to reverse the first manager's trade. By deferring both trades, sales commissions can be saved and potential adverse tax consequences can be avoided.

In another example, a trade may be deferred because the trade will result in a "wash sale". A wash sale occurs when an investor buys replacement assets within 30 days before or after the sale of substantially the same asset. If a wash sale occurs, the investor is prevented from claiming a loss on a sale of the asset and the basis for tax purposes of the replacement asset is readjusted to the basis of the sold asset.

In another example, a trade is deferred if the requested trade will increase the investor's capital gains tax burden because the asset that is the subject of the requested trade has not been held long enough by the investor to qualify for a lower capital gains rate.

If the virtual fund manager determines (904) that a trade is allowable, the virtual fund manager uses a lot decision engine 908, a set of lot selection rules 909, the lot matrix, and the holding matrix to determine which lot held by the investor in the investor's sub-accounts to trade. For example, the lot decision engine will choose to trade a lot with the highest basis in order to generate the smallest amount of capital gains from the sale of an asset. This reduces the adverse tax consequences to the investor from the trade. The virtual fund manager generates a trade aggregate 910 for the investor that is added to the previously described trade aggregates used by the virtual fund manager to execute non-deferred trades. The virtual fund manager also determines 912 if any deferred trades should now been executed on behalf of the investor in a to-be-described process. If any deferred trades are to be executed, the trades are added to the trade aggregate generated for the investor.

Figure 10:
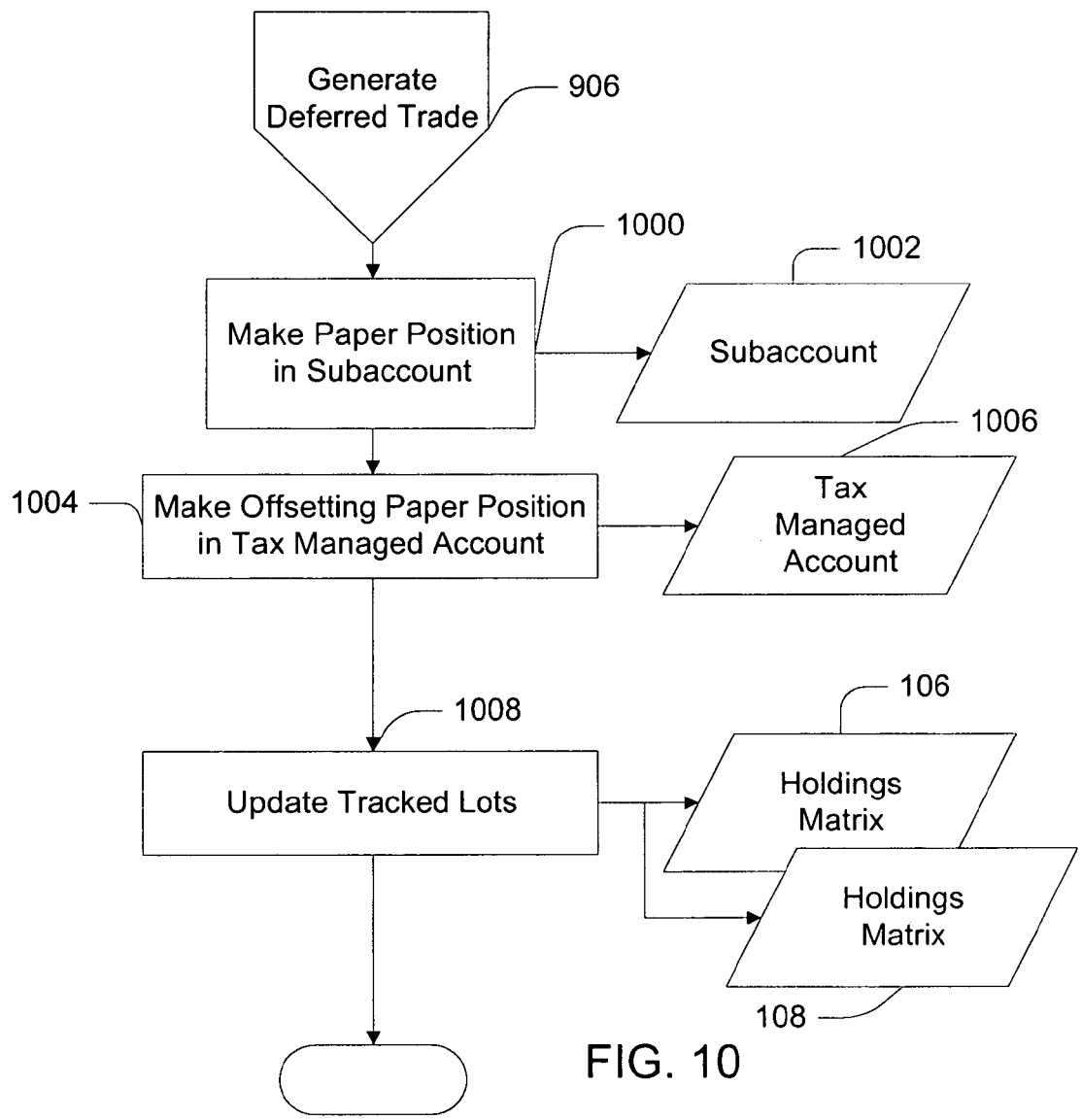
FIG. 10 is a process diagram of a deferred trade determination process used by a virtual mutual fund manager in accordance with an exemplary embodiment of the invention.

FIG. 10 is a process diagram of a deferred trade generation process 906 used by a virtual mutual fund manager in accordance with an exemplary embodiment of the invention. The virtual fund manager generates 1000 a paper position in a sub-account 1002 of the investor and the virtual fund manager also generates (1004) an offsetting paper position in a tax-managed sub-account 1006 maintained by the investor. The positions are paper positions because the investor still holds the asset, but the asset has been transferred from one sub-account, the sub-account, to another sub-account, the tax-managed sub-account, both of which are held by the investor. To continue to track the asset as it is moved between sub-accounts, the virtual fund manager updates (1008) holdings matrix 104 and lot matrix 106.

Figure 11:
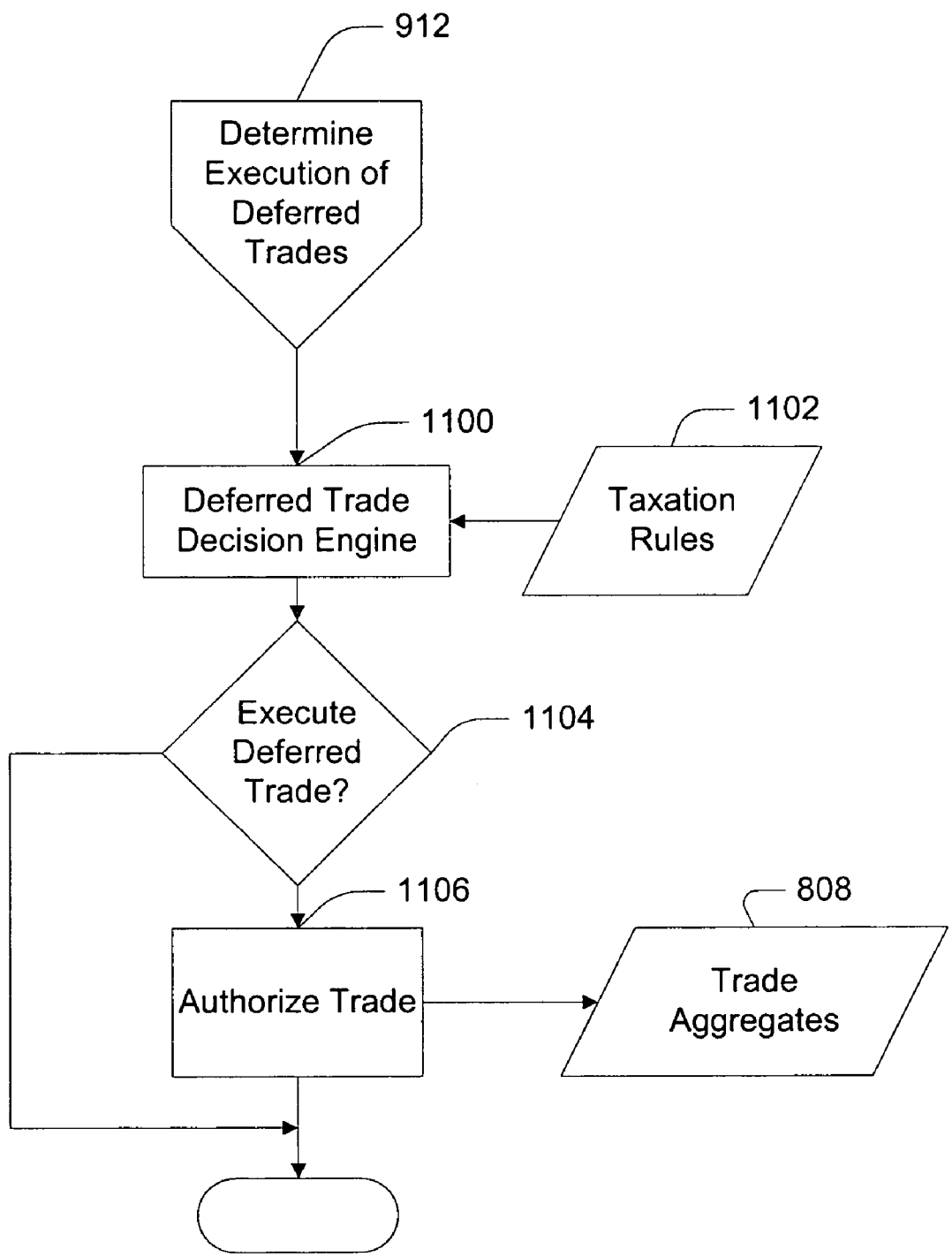
FIG. 11 is a process diagram of a deferred trade execution process used by a virtual mutual fund manager in accordance with an exemplary embodiment of the invention.

FIG. 11 is a process diagram of a deferred trade execution determination process 912 used by a virtual mutual fund manager in accordance with an exemplary embodiment of the invention. The virtual fund manager uses a deferred trade decision engine 1102 and a set of taxation rules in order to determine when a deferred trade should be executed. For example, if the investor can take advantage of lower capital gains rate by waiting for two weeks before a lot of assets are sold, the virtual fund manager waits for two weeks before the lot is sold. In another example, if a manager has requested that some assets should be acquired for an investor's sub-account but the acquisition would violate a wash rule, the virtual fund manager waits until the wash rule no longer applies and the investor may acquire the asset before actually executing the trade. If the virtual fund manager determines (1104) from the results of the deferred trade decision engine that a deferred trade should be executed, the virtual fund manager authorizes the trade by adding the deferred trade to the investor's aggregated trade 808 for execution by a trading house or custodian.

The use of deferred trades also allows a crossing trade. Crossing is related to any rule that results in a paper trade followed by an actual trade deferred to a later date. For example, assume that a rule is in place where 100 shares of stock A cannot be purchased during a current month, so the trade of stock A is deferred until next month. A paper trade is created indicating to the portfolio manager that 100 shares of stock A were purchased at the current market price. It is recorded that 100 shares of stock A will be bought in a following month.

During the following month, a request may come in by another manager or even the same manager to sell 100 shares or less of stock A. Since stock A was never actually purchased, the sale would have to be put on hold until the stock was actually bought in order to sell it. Instead of actually proceeding with the purchase and sale, the current trade is crossed with the deferred trade, creating another paper trade indicating that 100 shares of stock A were sold at a current market price and the deferred trade is canceled trade.

There are two advantages to crossing. Crossing may minimize wash sale exposure since crossing reduces actual trade volume. Crossing may also improve the quality of execution since no broker fees are incurred and the deferred trade volume is reduced. Crossing is the cancellation of one or more deferred trades or a portion of those trades where the net position change that would have resulted is negated by one or more new trades. The new trades or a portion of the new trades is also canceled according to the amount, which matches one or more deferred trades.

Figure 19:
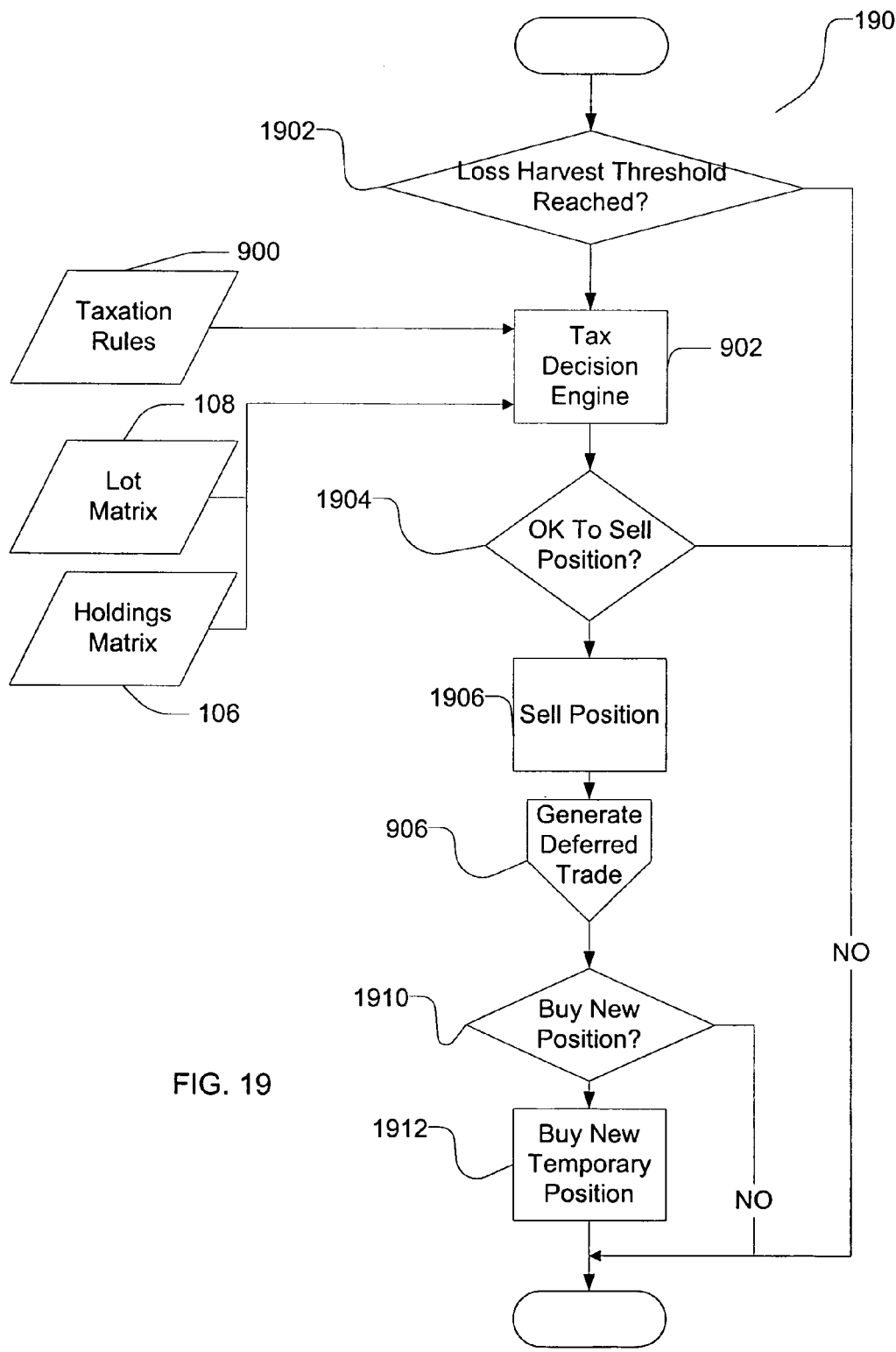
FIG. 19 is a process flow diagram of a loss-harvesting process in accordance with an exemplary embodiment of the present invention

FIG. 19 is a process flow diagram of a loss-harvesting process in accordance with an exemplary embodiment of the present invention. A loss-harvesting process 1900 implements a method whereby an holding from an investor's portfolio is sold when the current value of the holding is lower than the holding's purchase price by some pre-established threshold. The investor may then realize a loss and claim the loss for tax purposes. For instance, if stock A is purchased at $40, and a loss harvest threshold is established at 10 percent, the loss harvest process sells the holding when the price goes to $36. This is similar to a stop sell order. When the holding is sold off, a deferred trade is created to buy back the holding in 31 days. The 31 day wait is required to avoid a wash sale as previously described. The sale and repurchase of the holding is done to avoid reconstituting the portfolio and to create a loss sale transaction. In another embodiment, another temporary holding is purchased and held for the wash-sale period such as the next 30 days. The temporary holding is then sold to raise cash to regain the old holding. In addition to monitoring the price of the holding, the loss-harvesting process confirms whether there will be a wash-sale exposure in that holding. If there is a wash-sale exposure then the loss can not be claimed for the current year.

A loss-harvesting process determines (1902) if a position, such as a held stock, has declined in value to the point that its value drops below the loss-harvesting threshold. If so, the loss-harvesting process uses the previously described tax decision engine 902, taxation rules 900, lot matrix 108, and holdings matrix 106, to determine (1904) if the position can be sold. If the position can be sold, the loss-harvesting process sells (1906) the position and generates (906) a deferred trade. The deferred trade is deferred for a period of time sufficient to avoid a wash sale as previously described. The loss-harvesting process then determines (1910) if a new position should be bought to be held during the wash sale period for the position that was sold. If a new position should be bought, such as another stock, the loss-harvesting process buys (1912) a new position.

In summary, loss-harvesting is the selling of a position to capture a capital loss in the current year that can be used to offset capital gains. Since the purpose of the sale is to capture a capital loss, it is only done when the wash sale rule does not apply. After 31 days, the position is repurchased. During the 31-day interim, the money raised may or may not be used to purchase a substitute investment. If a substitute investment is purchased it is sold after 30 days to repurchase the original investment or at such other time when the wash sale rule is not in effect.

Figure 12:
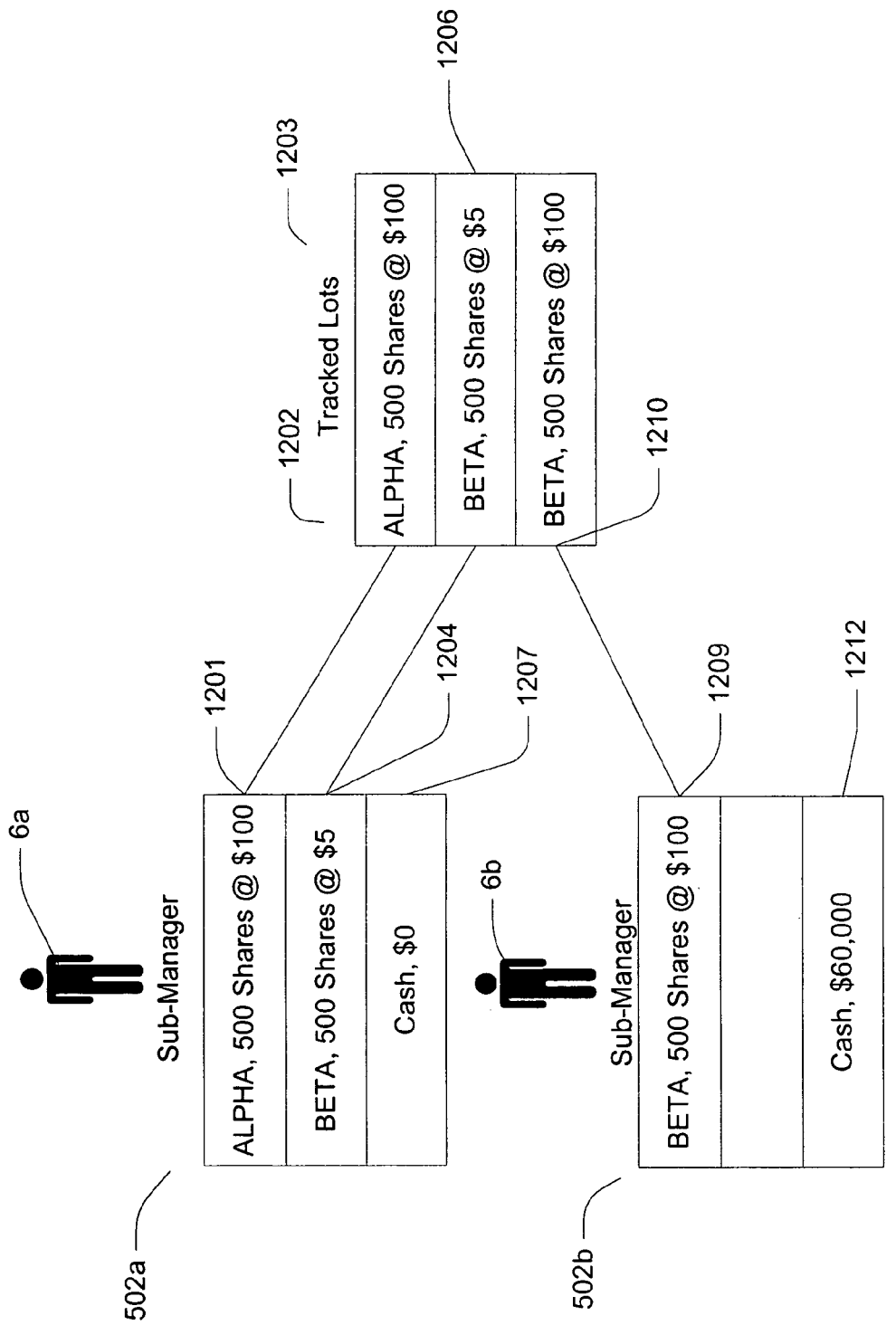
FIG. 12 is a block diagram of an example of an initial state for a plurality of sub-accounts before a trade as used by a virtual mutual fund manager in accordance with an exemplary embodiment of the invention.

FIG. 12 is a block diagram of an example of an initial state for a plurality of sub-accounts before a trade as used by a virtual mutual fund manager system in accordance with an exemplary embodiment of the invention. Manager 6a manages sub-account 502a for an investor as previously described. Manager 6b manages sub-account 502b for the same investor as previously described. Included in sub-account 502a, are two lots of assets. Lot 1201 includes 500 shares of ALPHA bought at $100 per share is tracked in a data set of tracked lots 1203 through the previously described holdings and lot matrices. The matrices include a record 1202 pointing to lot 1201 in sub-account 502a. The price of $100 per share is thus the basis of the lot ALPHA held by the investor in sub-account 502a. sub-account 502a further includes lot 1204 including 500 shares of BETA bought at $5 per share. Lot 1204 has a corresponding data record 1206 in the holding and lot matrices. sub-account 502a further includes a cash on hand amount 1207, currently at $0.

sub-account 502b includes lot 1209 including 500 shares of BETA purchased for $100 per share. Lot 1209 is tracked using data record 1210 included in the holding and lot matrices. sub-account 502b further includes a cash on hand amount of $60,000. This is the initial state of the sub-accounts in this example before any trades take place.

In operation, manager 6a makes a trade request that 500 shares of ALPHA and 500 shares of BETA are to be sold from sub-account 502a As ALPHA is now trading at $70 per share, the investor will take a loss through the sale of ALPHA. As BETA is selling at $120 per share, the investor will realize a gain through the sale of BETA. Since the investor holds 500 shares of BETA with a basis of $5 per share in lot 1204 of sub-account 502a and 500 shares of BETA in sub-account 502b with a basis of $100 per share, it would be more advantageous from a tax view point to sell the 500 shares of BETA from sub-account 502b and move the 500 shares of BETA from sub-account 502a to sub-account 502b. Using the set of tracked lots in the holding and lot matrices, a virtual fund manager can execute such a transaction as shown in FIG. 13.

Figure 13:
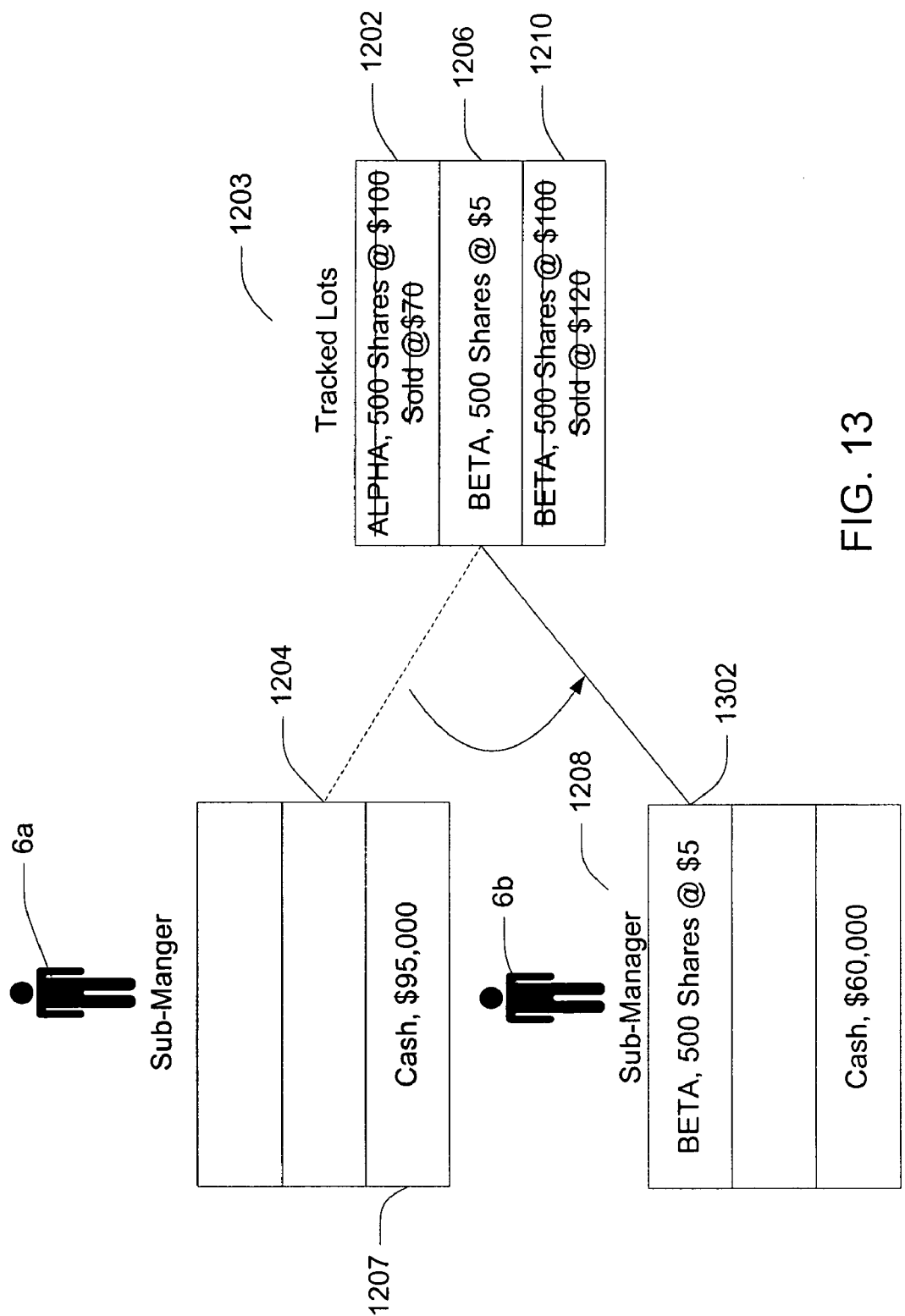
FIG. 13 is a block diagram of an example of a final state for a plurality of sub-accounts after a trade as used by a virtual mutual fund manager in accordance with an exemplary embodiment of the invention.

FIG. 13 is a block diagram of an example of a final state for a plurality of sub-accounts after a trade as used by a virtual mutual fund manager in accordance with an exemplary embodiment of the invention. The virtual fund manager generates a trade request to sell 500 shares of ALPHA at $70 per share from sub-account 502b. The sale is recorded in the set of tracked lots 1203 by updating the records in the holdings and lot matrices. As the investor has actually sold the assets, the assets are no longer tracked into the sub-accounts. The virtual fund manager also executes the sale of 500 shares of BETA. However, rather than sell lot 1204 in sub-account 502a, the virtual fund manager sells the lot in sub-account 502b and transfers lot 1204 from sub-account 502a to sub-account 502b, thus creating a new lot 1302 in sub-account 502b. The virtual fund manager updates the record 1206 in tracked lots 1203 maintained in the holdings and lot matrices in order to continue tracking the lot. At the end of the trade, sub-account 502a includes $95,000 in cash from the sale of the assets and sub-account 502b includes lot 1302 of 500 shares of BETA with a basis of $5 per share.

Figure 14:
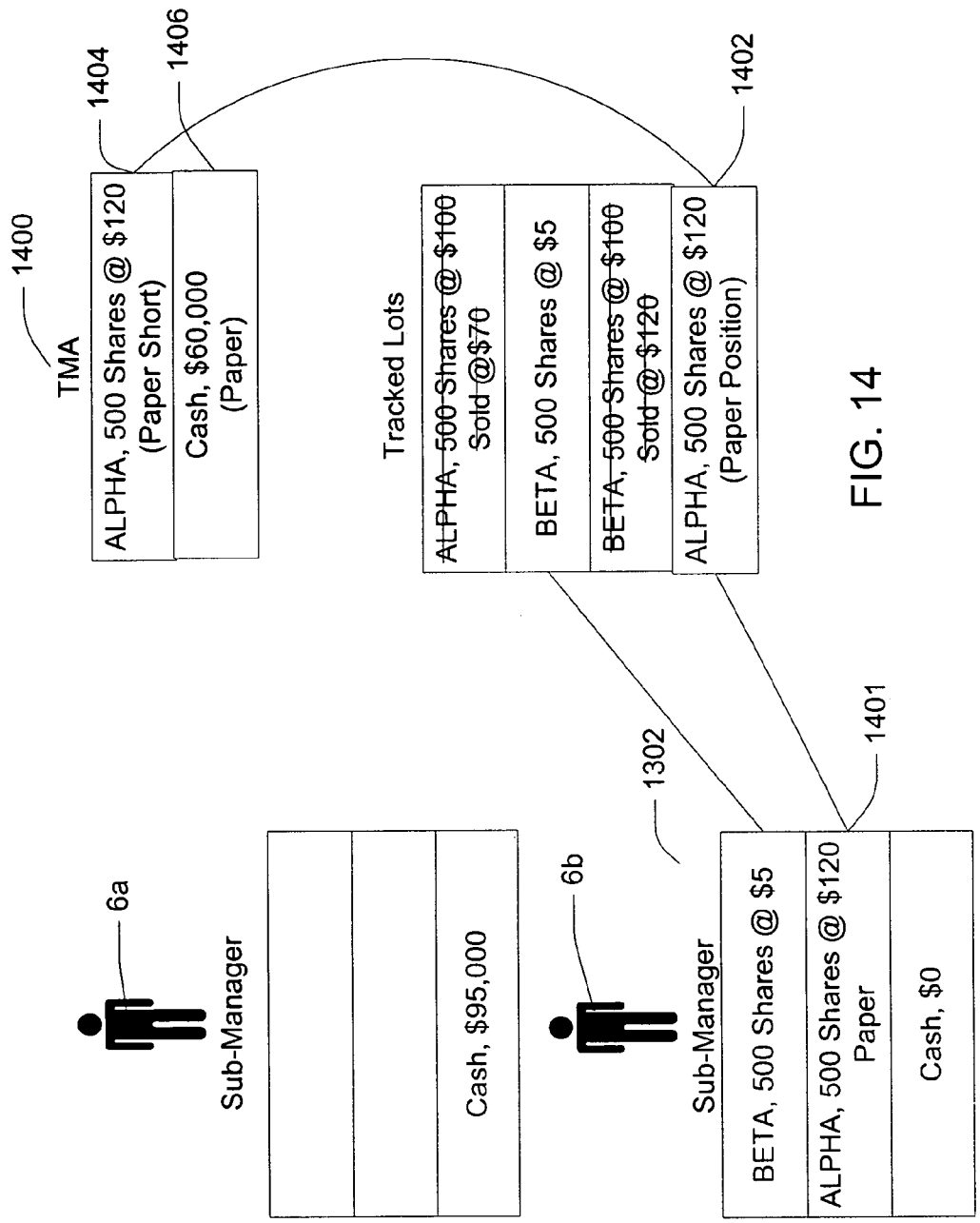
FIG. 14 is a block diagram of an example of states for a plurality of sub-accounts and a tax-managed sub-account during a deferred buy order as used by a virtual mutual fund manager in accordance with an exemplary embodiment of the invention.

FIG. 14 is a block diagram of an example of states for a plurality of sub-accounts and a tax-managed sub-account during a deferred buy order as used by a virtual mutual fund manager in accordance with an exemplary embodiment of the invention. As illustrated in the FIG. 12 and FIG. 13, manager 6a requested the sale of 500 shares of ALPHA with a basis of $100 per share for $70 per share, thus generating a loss of $30 per share. If the manager 6b now wants to purchase shares of ALPHA, manager 6b may be precluded by wash rules from making the purchase too close to manager 6a's sale of ALPHA. The virtual fund manager may accommodate the purchase of ALPHA by making a paper trade in a tax-managed sub-account 1400 and an offsetting paper trade in sub-account 502b as follows. The virtual fund manager transfers the purchase price from sub-account 502b to a cash sub-account 1406 included in the tax-managed sub-account. The virtual fund manager then creates a paper short 1404 in the tax-managed sub-account and offsetting lot 1401 in sub-account 502b. Both lot 1401 and the paper short 1404 are tracked in a set of tracked lots 1203 through record 1402 maintained in the holdings and lot matrices. At the end of the transaction, manager 6b has effectively "purchased" 500 shares of ALPHA, the purchase price has been deducted from sub-account 502b and placed into the tax-managed sub-account, and the investor has avoided a wash sale.

Figure 15:
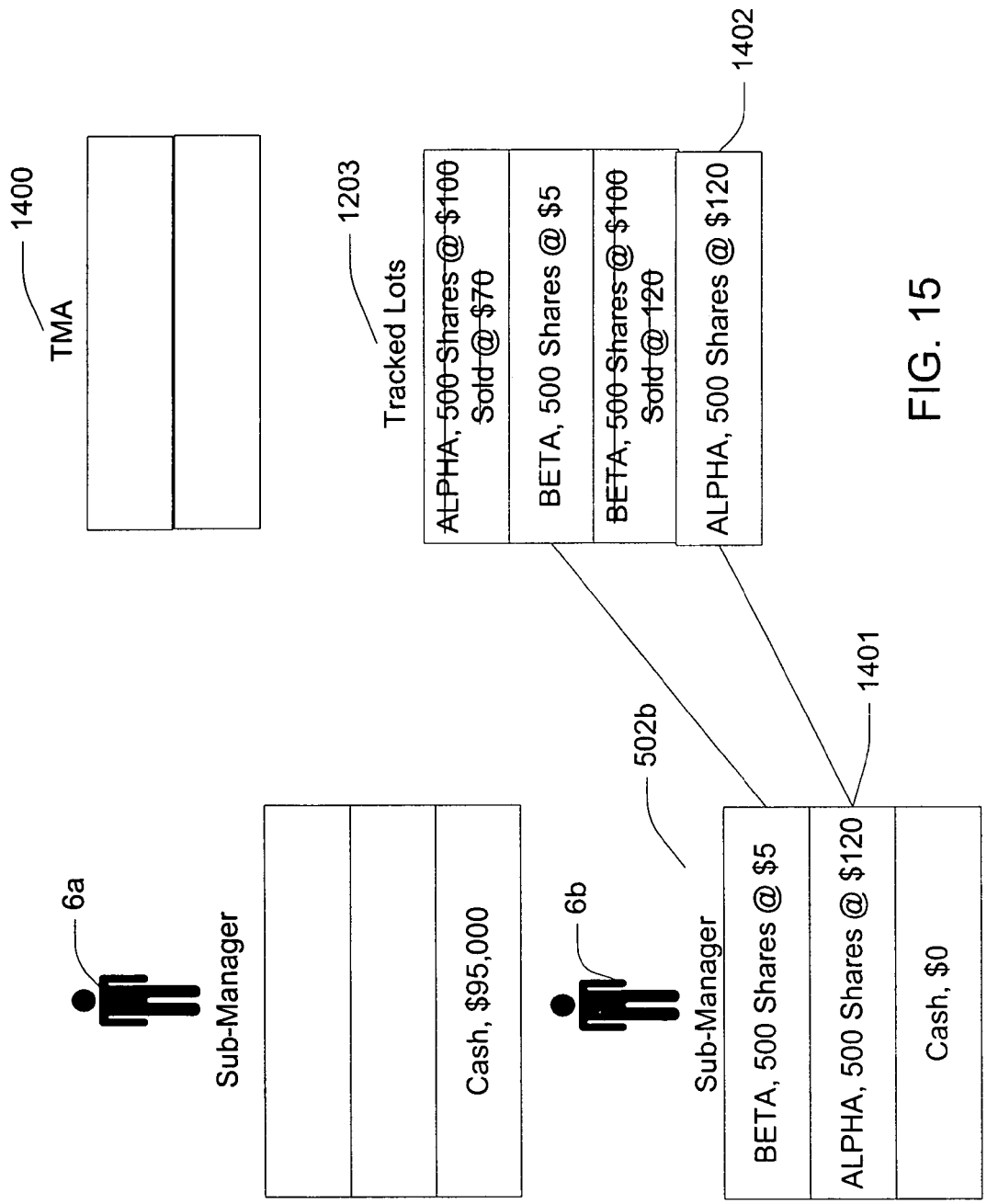
FIG. 15 is a block diagram of an example of a final state for a plurality of sub-accounts and a tax-managed sub-account after a deferred buy order is executed as used by a virtual mutual fund manager in accordance with an exemplary embodiment of the invention.

FIG. 15 is a block diagram of an example of a final state for a plurality of sub-accounts and a tax-managed sub-account after a deferred buy order is executed as used by a virtual mutual fund manager in accordance with an exemplary embodiment of the invention. The virtual fund manager defers executing the buy until the wash rule no longer applies. The virtual fund manager then buys the shares of ALPHA and the paper positions are reconciled in the tax-managed sub-account 1400 and the sub-account 502b. sub-account 502b now contains a lot 1401 including 500 shares of ALPHA with a basis of $120 as requested by manager 6b. The lot is tracked using a record entry 1402 in a set of tracked lots 1203 maintained in the holdings and lot matrices.

Figure 16:
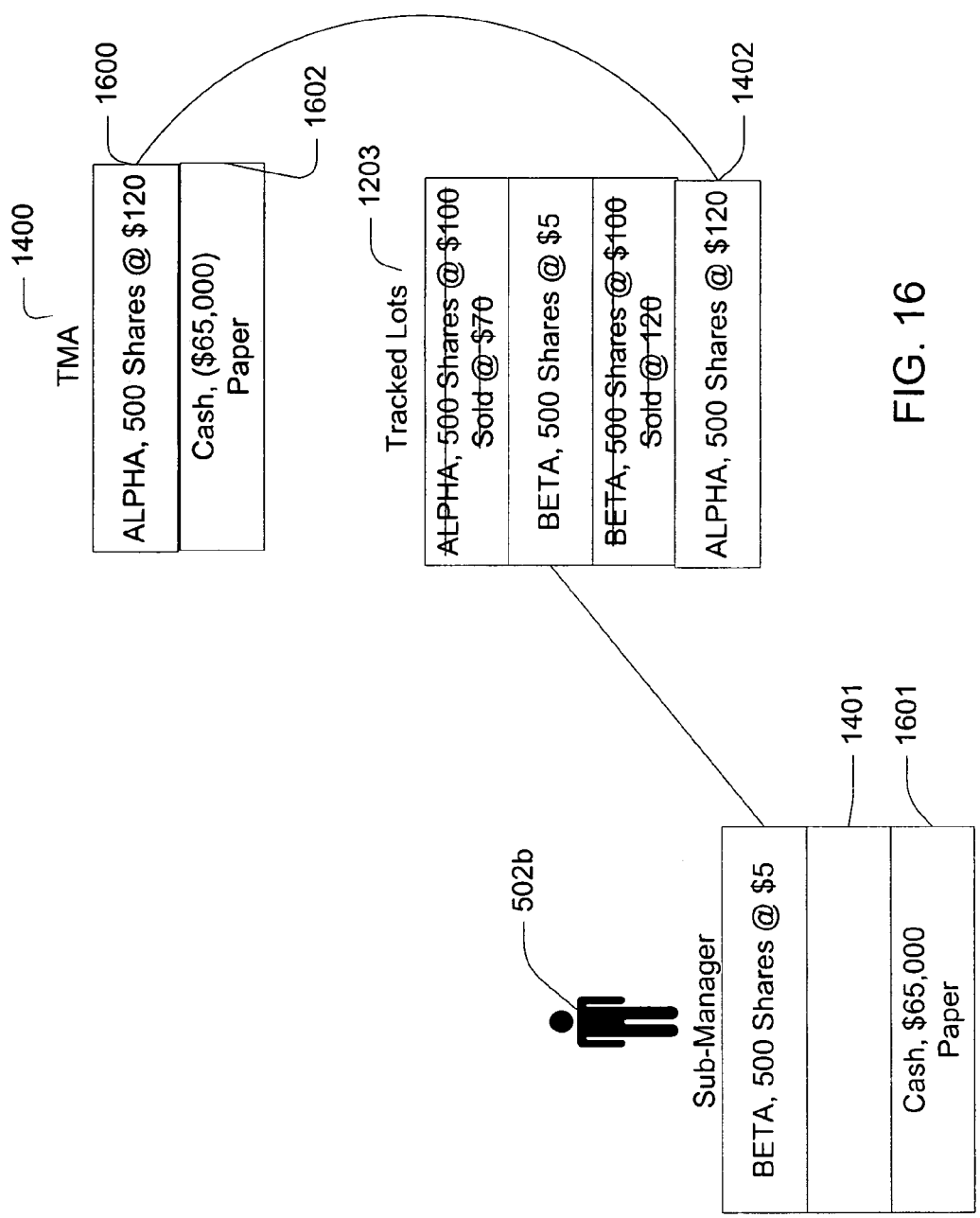
FIG. 16 is a block diagram of an example of states for a plurality of sub-accounts during a deferred sell order as used by a virtual mutual fund manager in accordance with an exemplary embodiment of the invention.

FIG. 16 is a block diagram of an example of states for a plurality of sub-accounts during a deferred sell order as used by a virtual mutual fund manager in accordance with an exemplary embodiment of the invention. Manager 6a may request the sale of 500 shares of ALPHA from sub-account 502b. However, it may be more advantageous from a tax view point for the investor to hold on to the shares until the investor can take advantage of a reduced long-term capital gains tax rate. The virtual fund manager can make the sale from sub-account 502b by making a paper trade in a tax-managed sub-account 1400. The virtual fund manager transfers the shares of ALPHA from sub-account 502b to a lot 1600 in the tax-managed sub-account. At the same time, the virtual fund manager credits sub-account 520b with the sale price 1601 and debits the tax-managed sub-account with the sale price 1602. The lot of shares of ALPHA is tracked using the set of tracked lots including a record 1402 maintained in the holding and lot matrices.

Figure 17:
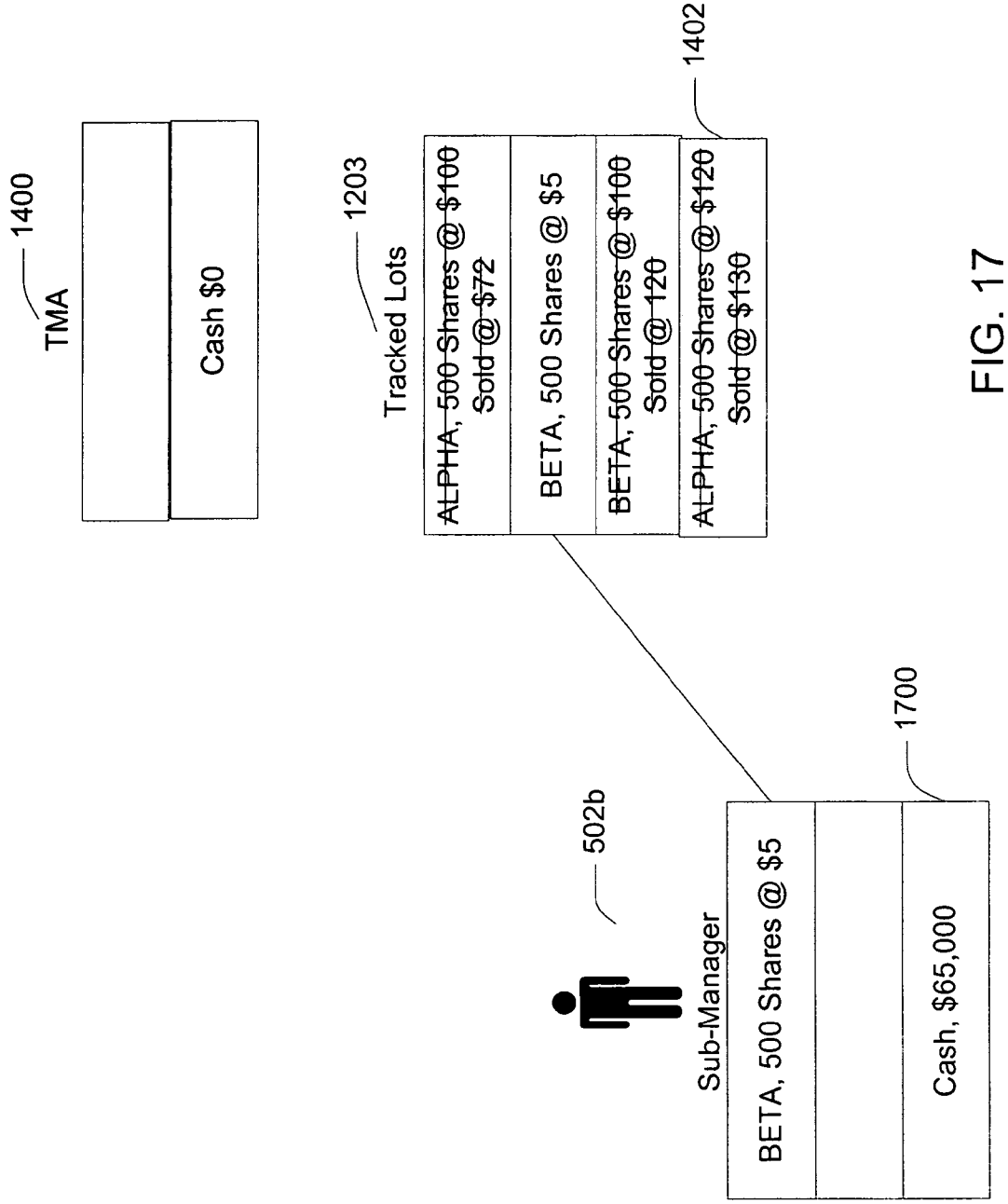
FIG. 17 is a block diagram of an example of a final state for a plurality of sub-accounts after a deferred sell order is executed as used by a virtual mutual fund manager in accordance with an exemplary embodiment of the invention.

FIG. 17 is a block diagram of an example of a final state for a plurality of sub-accounts after a deferred sell order is executed as used by a virtual mutual fund manager in accordance with an exemplary embodiment of the invention. The virtual fund manager waits as previously described until the sale of the shares held in the tax-managed sub-account no longer creates adverse tax consequences for the investor. The virtual fund manager then authorizes the sale of the shares of ALPHA and credits the tax-managed sub-account erasing the sale price debit 1602 and replaces the paper sale price position in sub-account 502b with an actual credit 1700. The virtual fund manager updates a record 1402 in a set of tracked lots 1203 maintained in the holding and lot matrices to indicate that the sale has been executed.

Figure 18:
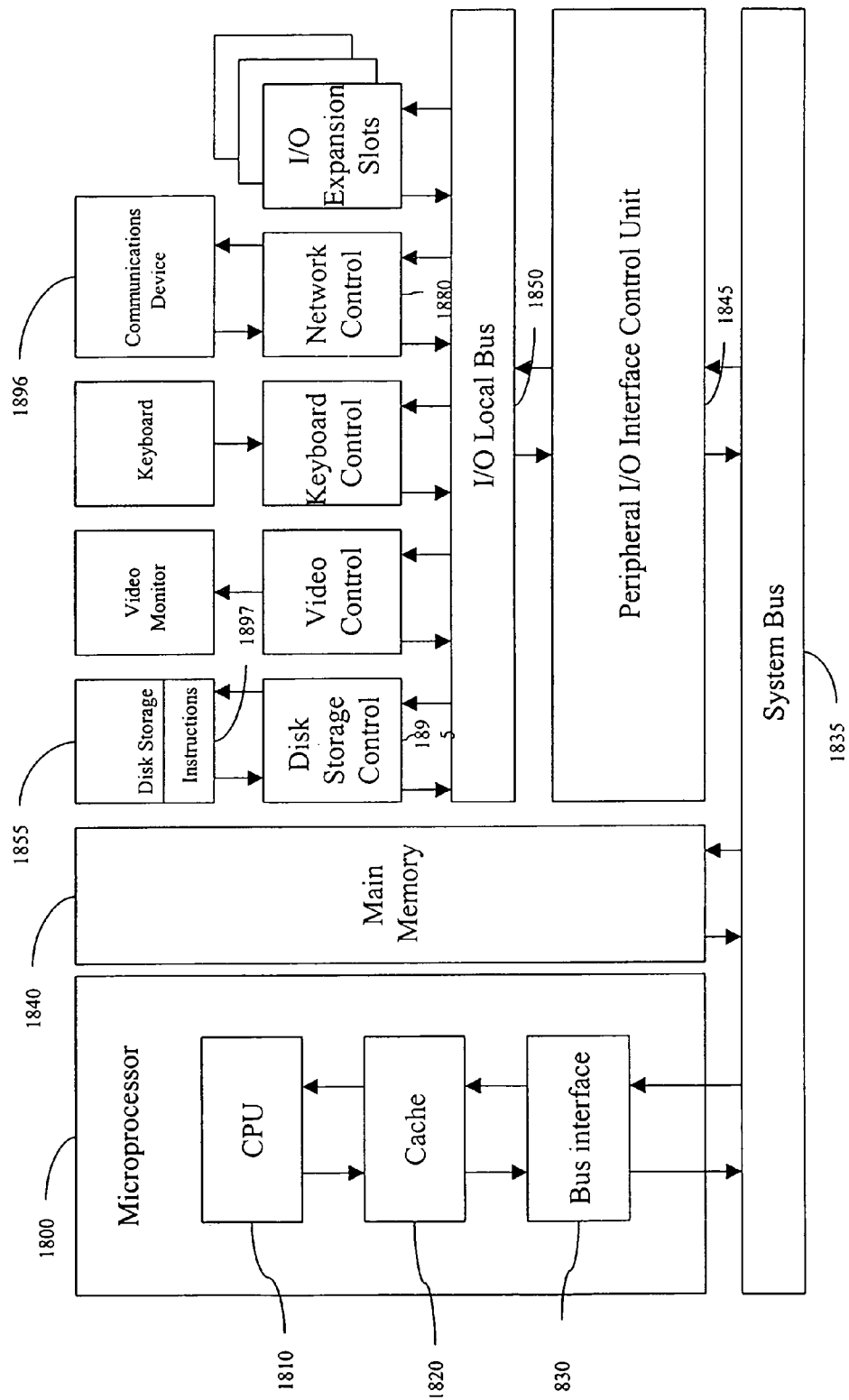
FIG. 18 is an architecture diagram for a host for a virtual mutual fund manager in accordance with an exemplary embodiment of the invention.

FIG. 18 is an architecture diagram for a host for a virtual mutual fund management system in accordance with an exemplary embodiment of the invention. A microprocessor 1800, including a Central Processing Unit (CPU) 1810, a memory cache 1820, and a bus interface 1830, is operatively coupled via a system bus 1835 to a main memory 1840 and a I/O control unit 1845. The I/O interface control unit is operatively coupled via a I/O local bus 1850 to a disk storage controller 1895, and a network controller 1880.

The disk storage controller is operatively coupled to a disk storage device 1855. Computer program instructions 1897 for implementing a virtual fund manager are stored on the disk storage device until the microprocessor retrieves the computer program instructions and stores them in the main memory. The microprocessor then executes the computer program instructions stored in the main memory to implement the features of a virtual fund manager.

Although this invention has been described in certain specific embodiments, many additional modifications and variations would be apparent to those skilled in the art. It is therefore to be understood that this invention may be practiced otherwise than as specifically described. Thus, the present embodiments of the invention should be considered in all respects as illustrative and not restrictive, the scope of the invention to be determined by any claims supportable by this application and the claims' equivalents.

What is claimed is:

1. A computer-implemented method of managing assets comprising:
 managing a virtual mutual fund wherein said virtual mutual fund comprises a collection of assets managed collectively but tracked separately with separately owned lots on behalf of a plurality of investors;
 providing a computer database associating a plurality of lots owned by each of said plurality of investors and associating said plurality of lots as tradeable regardless of initiator of the purchase of said plurality of lots;
 providing lot selection rules;
 receiving a requested trade;

selecting a lot for trading from said plurality of lots using said computer database, said lot selection rules, and said requested trade;

providing taxation rules;

determining if a trade using said selected lot should be deferred using the computer database and said taxation rules;

generating a deferred trade in a tax-managed sub-account if it is determined that said requested trade should be deferred; and selecting said deferred trade in said tax-managed sub-account for execution if it is determined that said deferred trade should no longer be deferred using said computer database and said taxation rules.

2. The computer-implemented method of claim 1, wherein said lot selection rules include a rule for selecting a lot with a highest cost basis for trading.

3. The computer-implemented method of claim 1, further comprising:

receiving a plurality of requested trades; selecting a plurality of lots for trade execution; and aggregating any executed trades for reconciliation.

4. A computer-implemented method of managing assets comprising:

managing a plurality of virtual mutual funds with separate lots owned by one or more individual investors and tracked separately;

providing a computer-implemented lot matrix associating a plurality of lots with said plurality of virtual mutual funds, each lot of said plurality of lots tradeable regardless of initiator of purchase of said lot and associating said plurality of lots as separately owned by said one or more investors;

providing lot selection rules;

receiving a requested trade;

for each of said plurality of virtual mutual funds, performing the following: for said requested trade, selecting a lot from said plurality of lots for execution of said requested trade using said lot selection rules, and said lot matrix;

determining if said requested trade should be deferred using said lot matrix, taxation rules, and said lot selection rules;

generating a deferred trade in a tax-managed sub-account if it is determined that the requested trade should be deferred; and selecting said deferred trade in said tax-managed sub-account for execution if it is determined that said deferred trade should no longer be deferred using said lot matrix and said taxation rules.

5. The computer-implemented method of claim 4, further comprising: generating trades for execution from selected lot; and aggregating generated trades for a virtual mutual funds of said plurality of mutual funds.

6. The computer-implemented method of claim 4, further comprising aggregating tax savings across said plurality of virtual mutual funds for each of said one or more individual investors.

7. The computer-implemented method of claim 4, further comprising:

providing a holdings matrix associating one or more managers with said plurality of virtual mutual funds; and wherein in said selecting said lot for execution of said requested trade, further comprising using said holdings matrix.

8. The computer-implemented method of claim 4, wherein said lot selection rules comprise a rule for selecting a lot with a highest cost basis for trading.

9. A computer-implemented data processing system for managing assets comprising:

a virtual mutual fund wherein said virtual mutual fund comprises a collection of assets managed collectively but tracked separately with separately owned lots on behalf of a plurality of investors;

a computer database adapted to associate a plurality of lots of said plurality of investors and adapted to associate said plurality of lots as tradeable regardless of initiator of the purchase of one of said plurality of lots;

a processor; and a memory coupled to said processor and having program instructions stored therein, said processor being operable to execute said program instructions, said program instructions including:

lot selection rules;

instructions receiving a requested trade; and selecting a lot for trading from said plurality of lots using said computer database, said lot selection rules, and said requested trade;

taxation rules;

instructions determining if a trade using said selected lot should be deferred using said computer database and said taxation rules; and generating a deferred trade in a tax-managed sub-account if it is determined that said requested trade should be deferred; and instructions being adapted to select a deferred trade in said tax-managed sub-account for execution if it is determined that said deferred trade should no longer be deferred using said computer database and said taxation rules.

10. The computer-implemented data processing system of claim 9, wherein said lot selection rules include a rule adapted to select a lot with a highest cost basis for trading.

11. The computer-implemented data processing system of claim 9, said program instructions further including: receiving a plurality of requested trades; selecting a plurality of lots for trade execution; and aggregating any executed trades for reconciliation.

12. A computer-implemented data processing system for managing assets comprising:

a plurality of virtual mutual funds with separate lots owned by one or more individual investors; a computer-implemented lot matrix database associating a plurality of lots with said plurality of virtual mutual funds, each lot of said plurality of lots tradeable regardless of initiator of purchase of said lot; a processor; and a memory coupled to said processor and having program instructions stored therein, said processor being operable to execute said program instructions, said program instructions including:

lot selection rules;

instructions receiving one or more requested trades; and for each of said plurality of virtual mutual funds, being adapted to perform the following: for said requested trade:

being adapted to select a lot from said plurality of lots for execution of said requested trade using said lot selection rules, and said lot matrix;

instructions determining if said requested trade should be deferred using said lot matrix, taxation rules; and being adapted to generate a deferred trade in a tax-managed sub-account if it is determined that said requested trade should be deferred; and instructions further including selecting a deferred trade in a tax-managed sub-account for execution if it is determined that said deferred trade should no longer be deferred using said lot matrix and said taxation rules.

13. The computer-implemented data processing system of claim 12, said program instructions generating trades for execution from said selected lots; and aggregating said generated trades for a virtual mutual fund from the one or more virtual mutual funds.

14. The computer-implemented data processing system of claim 12, the program instructions further including aggregating tax savings across said plurality of virtual mutual funds for each of the one or more investors.

15. A computer-implemented method of managing assets comprising:

managing a virtual mutual fund comprising a collection of assets managed collectively but tracked separately with separately-owned lots on behalf of a plurality of investors;

providing a computer database associating a plurality of holdings owned by each of said plurality of investors as tradeable, regardless of initiator of purchase of a holding;

providing holding selection rules;

receiving a requested trade;

selecting a holding for trading from said plurality of holdings using said computer database, said holding selection rules, and said requested trade;

determining whether a trade using said holding should be deferred using said computer database and said holding selection rules; and generating a deferred trade in a tax-managed sub-account associated with one investor of said plurality of investors using said holding if it is determined that said holding should be sold in order to realize a loss for said one investor, wherein a manager's account is unaffected by said loss realized by sale of said holding.

16. The computer-implemented method of claim 15, further comprising generating an offsetting purchase of said holding if it is determined that enough time has passed to avoid a wash-sale violation.

17. The computer-implemented method of claim 16, further comprising:

generating an offsetting purchase of a temporary offsetting holding; and generating a sale of said temporary offsetting holding when generating said offsetting purchase of said holding.

18. A computer-implemented data processing system for managing assets comprising:

a virtual mutual fund comprising a collection of assets managed collectively but tracked separately with separate accounts on behalf of a plurality of investors;

a computer-implemented database associating a plurality of holdings owned by each of said plurality of investors, wherein a holding may be traded regardless of initiator of purchase of said holding;

a processor; and a memory coupled to said processor and having program instructions stored therein, said processor being operable to execute the program instructions, the program instructions providing at least one holding selection rule; receiving a requested trade; selecting a holding for trading from said plurality of holdings using said computer-implemented database, said holding selection rule; and said requested trade; determining whether said trade using said holding should be deferred using said computer-implemented database and said holding selection rules; and generating a deferred trade in a tax-managed sub-account associated with one investor of said plurality of investors using said holding if it is determined that said holding should be sold in order to realize a loss for said one investor, wherein a manager's account is unaffected by said loss realized by sale of said holding.

19. The computer-implemented data processing system of claim 18, wherein the program instructions generate an offsetting purchase of said holding if it is determined that enough time has passed to avoid a wash-sale violation.

20. The computer-implemented data processing system of claim 19, the program instructions further generating an offsetting purchase of a temporary offsetting holding;

and generating a sale of said temporary offsetting holding when generating said offsetting purchase of said holding.

21. A computer-implemented method of managing assets comprising:

managing a plurality of virtual mutual funds comprising a collection of assets managed collectively but tracked separately with separately-owned lots on behalf of one or more investors;

providing a computer database associating a plurality of holdings owned by each of said one or more investors to separate managers in separate manager accounts wherein a holding may be traded regardless of initiator of purchase of said holding;

providing holding selection rules;

receiving a requested trade; selecting said holding for trading from said plurality of holdings using said computer database, said holding selection rules, and said requested trade;

determining whether said trade using said holding should be deferred using said computer database and said holding selection rules; and generating a deferred trade in a tax-managed sub-account associated with one investor of said one or more investors using said holding if it is determined that said holding should be sold in order to realize a loss for the investor, wherein a manager's account is unaffected by said loss realized by sale of said holding.

22. The computer-implemented method of claim 21, further comprising generating an offsetting purchase of said holding if it is determined that enough time has passed to avoid a wash-sale violation.

23. The computer-implemented method of claim 22, further comprising:

generating an offsetting purchase of a temporary offsetting holding; and generating a sale of said temporary offsetting holding when generating said offsetting purchase of said holding.

24. A computer-implemented method of managing assets comprising:

managing a plurality of virtual mutual funds comprising a collection of assets managed collectively but tracked separately with separately-owned lots on behalf of a plurality of investors;

providing a computer database associating a plurality of holdings owned by each of said plurality of investors to separate managers in separate manager accounts wherein a holding may be traded regardless of initiator of purchase of said holding;

providing holding selection rules;

receiving a requested trade;

selecting said holding for trading from said plurality of holdings using said computer database, said holding selection rules, and said requested trade;

determining whether said trade using said holding should be deferred using said computer database and said holding selection rules; and generating a deferred trade in a tax-managed sub-account associated with one investor of said plurality of investors using said holding if it is determined that said holding should be sold in order to realize a loss for the one investor, wherein a manager's account is unaffected by said loss realized by sale of said holding.

25. The computer-implemented method of claim 24, further comprising generating an offsetting purchase of said holding if it is determined that enough time has passed to avoid a wash-sale violation.

26. The computer-implemented method of claim 25, further comprising:

generating an offsetting purchase of a temporary offsetting holding; and generating a sale of said temporary offsetting holding when generating said offsetting purchase of said holding.

27. A computer-implemented data processing system for managing assets comprising:

a plurality of virtual mutual funds comprising a collection of assets managed collectively but tracked separately with separate accounts on behalf of one or more investors;

a computer-implemented database associating a plurality of holdings owned by each of said one or more investors, wherein a holding may be traded regardless of initiator of purchase of said holding;

a processor; and a memory coupled to said processor and having program instructions stored therein, said processor being operable to execute the program instructions, the program instructions providing at least one holding selection rule; receiving a requested trade; selecting a holding for trading from said plurality of holdings using said computer-implemented database, said holding selection rule; and said requested trade; determining whether said_trade using said holding should be deferred using said computer-implemented database and said holding selection rules; and generating a deferred trade in a tax-managed sub-account associated with one investor of said one or more investors using said holding if it is determined that said holding should be sold in order to realize a loss for said one investor, wherein a manager's account is unaffected by said loss realized by sale of said holding.

28. The computer-implemented data processing system of claim 27, wherein the program instructions generating an offsetting purchase of said holding if it is determined that enough time has passed to avoid a wash-sale violation.

29. The computer-implemented data processing system of claim 28, the program instructions further generating an offsetting purchase of a temporary offsetting holding;

and generating a sale of said temporary offsetting holding when generating said offsetting purchase of said holding.

30. A computer-implemented data processing system for managing assets comprising:

a plurality of virtual mutual funds comprising a collection of assets managed collectively but tracked separately with separate accounts on behalf of a plurality of investors;

a computer-implemented database associating a plurality of holdings owned by each of said plurality of investors, wherein a holding may be traded regardless of initiator of purchase of said holding;

a processor; and a memory coupled to said processor and having program instructions stored therein, said processor being operable to execute the program instructions, the program instructions providing at least one holding selection rule; receiving a requested trade; selecting a holding for trading from said plurality of holdings using said computer-implemented database, said holding selection rule; and said requested trade; determining whether said trade using said holding should be deferred using said computer-implemented database and said holding selection rules; and generating a deferred trade in a tax-managed sub-account associated with one investor of said plurality of investors using said holding if it is determined that said holding should be sold in order to realize a loss for said one investor, wherein a manager's account is unaffected by said loss realized by sale of said holding.

31. The computer-implemented data processing system of claim 30, wherein the program instructions generate an offsetting purchase of said holding if it is determined that enough time has passed to avoid a wash-sale violation.

32. The computer-implemented data processing system of claim 31, the program instructions further generating an offsetting purchase of a temporary offsetting holding;

and generating a sale of said temporary offsetting holding when generating said offsetting purchase of said holding.

* * * * *